(12) United States Patent
Vulk, Jr.

(10) Patent No.: US 9,656,714 B2
(45) Date of Patent: May 23, 2017

(54) RECUMBENT BICYCLE WITH IMPROVED REAR WHEEL SUPPORT AND PEDAL LOCATING METHOD

(71) Applicant: Joseph Patrick Vulk, Jr., Issaquah, WA (US)

(72) Inventor: Joseph Patrick Vulk, Jr., Issaquah, WA (US)

(73) Assignee: Joseph P. Vulk, Jr., Issaquah, WA (US)

( * ) Notice: Subject to any disclaimer, the term of this patent is extended or adjusted under 35 U.S.C. 154(b) by 0 days.

(21) Appl. No.: 14/641,436

(22) Filed: Mar. 9, 2015

(65) Prior Publication Data

US 2016/0264202 A1    Sep. 15, 2016

(51) Int. Cl.
| | |
|---|---|
| *B62K 3/10* | (2006.01) |
| *B62K 13/00* | (2006.01) |
| *B62K 17/00* | (2006.01) |
| *B62K 3/00* | (2006.01) |
| *B62K 5/06* | (2006.01) |
| *B62K 3/14* | (2006.01) |
| *B62K 21/12* | (2006.01) |
| *B62M 1/36* | (2013.01) |
| *B62J 17/00* | (2006.01) |

(52) U.S. Cl.
CPC ............... *B62K 3/005* (2013.01); *B62J 17/00* (2013.01); *B62K 3/14* (2013.01); *B62K 5/06* (2013.01); *B62K 21/12* (2013.01); *B62M 1/36* (2013.01)

(58) Field of Classification Search
CPC ........................................................ B62K 3/005

USPC ................................ 280/284, 288, 288.1, 231
See application file for complete search history.

(56) References Cited

U.S. PATENT DOCUMENTS

| 602,034 | A | * | 4/1898 | Murphy | ................. | B62K 21/00 |
|---|---|---|---|---|---|---|
| | | | | | | 280/266 |
| 3,801,130 | A | * | 4/1974 | Belden | .................... | B62K 21/00 |
| | | | | | | 16/44 |
| 4,303,256 | A | * | 12/1981 | Mortensen | ............... | B62K 3/02 |
| | | | | | | 280/261 |
| 4,506,902 | A | * | 3/1985 | Maebe | ...................... | B62K 3/00 |
| | | | | | | 280/266 |
| 4,647,060 | A | * | 3/1987 | Tomkinson | ............ | B62K 3/005 |
| | | | | | | 280/278 |
| 4,818,160 | A | * | 4/1989 | Rabe | ....................... | B23Q 1/48 |
| | | | | | | 408/88 |
| 6,095,539 | A | * | 8/2000 | Graham | .................... | B62K 3/12 |
| | | | | | | 280/231 |

(Continued)

*Primary Examiner* — Tony Winner
(74) *Attorney, Agent, or Firm* — Joseph P. Vulk, Jr.

(57) ABSTRACT

A recumbent bicycle or recumbent tricycle with a removable rear fork that can be swapped with another rear style fork. The rear fork is clamped so that is cannot turn but can be easily swapped. The rear fork can be swapped according to riding conditions or for aesthetics. The rider may use one fork for stiff characteristics, another shock absorbing fork for off-road, or for any style or color at the discretion of the rider, thus allowing greater flexibility. Also, the bicycle includes removable tandem seat for a second rider with a removable pedal assembly for the second rider. In this way the same bicycle can be single or tandem capable. Another feature is a removable pannier rack assembly which adds more choices and capabilities for the rider. These various combinations are highly appealing to the cyclist community.

8 Claims, 23 Drawing Sheets

(56) References Cited

U.S. PATENT DOCUMENTS

2008/0296862 A1* 12/2008 Chen ................. B62K 3/12
280/226.1

* cited by examiner

RECUMBENT BICYCLE WITH IMPROVED REAR WHEEL SUPPORT AND PEDAL LOCATING METHOD

TECHNICAL FIELD

This invention relates to recumbent bicycles and more particularly, to an improved rear wheel attachment method and improved pedal locating and adjustment method—both for recumbent bicycles or tricycles.

BACKGROUND

The recumbent bicycle and recumbent tricycle art is relatively young. As such, many inventors are experimenting with various methods of achieving optimized results associated with the industry in general.

Recumbent bicycles and recumbent tricycles generally comprise a main frame coupled to a front wheel and a rear wheel or wheels with a seating area that places the rider in a supine position. In most prior art, the main frame includes a hollow center tube and a beam having a first end, and a second end coupled to the pedals of the recumbent. The first end of the beam commonly telescopes within the center tube to adjust the position of the pedals relative to the seating area to accommodate riders of different height. The beam is held in place within the center tube by a beam clamp.

U.S. Pat. No. 8,342,555 reveals a recumbent tricycle typical of the industry with an adjustable pedal locating method. The pedal bearing assembly is attached to a tubular support piece that slides inside a coaxial tubular member attached to the primary bicycle frame. The pedal assembly is adjusted by loosening clamping bolts and sliding the pedal assembly further in or out of the support member attached to the primary bicycle in a telescopic fashion.

U.S. Pat. No. 6,585,278 and WO 100015965 A2 both reveal recumbent bicycles typical of the industry with a front and rear-suspension. As can be seen, the assembly of the rear suspension requires components and, or frame design specific to the configuration depicted. Also shown is a similar pedal assembly adjustment method consisting of a pedal bearing assembly attached to a tubular support piece that slides inside a coaxial tubular member which is attached to the primary bicycle frame.

U.S. Pat. No. 7,753,388 reveals a front-wheel powered recumbent bicycle which has a front wheel shock-absorber. Their invention is, in part, an approach to compensate for the variation of distance between the front wheel center and pedal sprocket center experienced as the front shock translates. The translational motion of the front shock increases or decreases the distance between the noted centers and causes reduced or increased chain tension in the process.

If the position of the pedals is adjusted relative to the frame of the vehicle, it is often accomplished with the telescopic motion described above.

Existing art, whether bicycle or tricycle, consist of generally similar rear wheel mounting methods. Typical mounting methods consist of permanently affixed primary frame appendages to which the wheel is attached with nut and bolt.

Existing art with rear-suspensions generally consist of a frame assembly having front and rear portions connected at one or more pivot points with a shock absorber taking the load of the rider—see prior art.

Front shock absorber translation is not typically a problem for chain tension considering the chain on a bicycle or tricycle is usually in the rear of the vehicle. In the prior art of front-wheel powered bicycles with front shock absorbers, the assembly of the front power train is allowed to flex such that chain tension is generally maintained.

Panniers are often used on recumbent bicycles and tricycles with various attachment methods.

The following is a list of a few disadvantages within the current art of recumbent bicycles and tricycles as it pertains to the invention described herein:

1) Prior art of adjustable pedal locating methods require a long internal telescoping tube for adjustment, and a long external support tube and does not maximize the adjustment possible for the amount of material used.
2) Prior art of rear suspension designs are relatively complicated, heavy, and do not take full advantage of existing technology.
3) Prior art of rear wheel attachment methods do not use existing front wheel attachment technology (such as forks, bearings, head-tubes, seals etc). This requires many unique parts.
4) Prior art of rear wheel attachment methods do not allow for flexibility in the owners choice of what type of rear wheel attachment may be used.
5) Prior art of rear wheel attachment methods do not allow for use of rigid or shock-absorber type forks interchangeably limiting performance under various riding conditions.

BRIEF DESCRIPTION OF DRAWINGS

NOTE: For simplicity of illustration, bearings, O-rings, nuts, bolts, washers and minutiae of common cycling industry hardware are not depicted as they are known to those with skill in the art. When they are shown, it is purely for illustrative purposes and not intended to capture all embodiments of the invention disclosed.

DETAILED DESCRIPTION OF INVENTION

Figure 1:
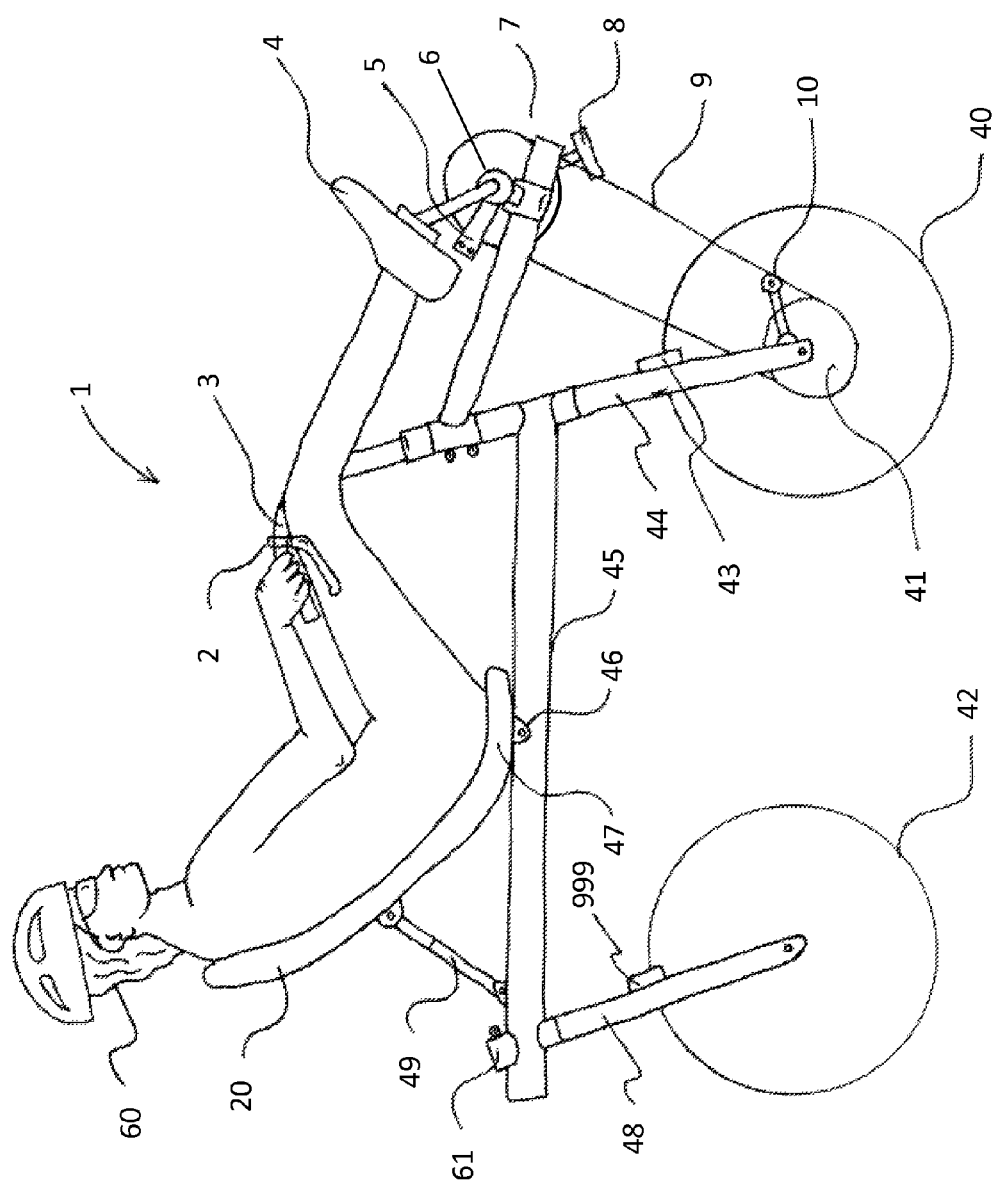
FIG. 1 is a side view of a cyclist seated upon a recumbent bicycle having improved pedal locating and adjustment method, and improved real wheel attachment method. Both revealed in this invention.

The various embodiments and variations thereof illustrated in the accompanying Figures and/or described herein are merely exemplary and are not meant to limit the scope of the invention. It is to be appreciated that numerous variations of the invention have been contemplated as would be obvious to one of ordinary skill in the art with the benefit of this disclosure. Rather, the scope and breadth afforded this document should only be limited by the claims provided herein while applying either the plain meaning to each of the terms and phrases in the claims or the meaning clearly and unambiguously provided in this specification.

TERMINOLOGY

The terms and phrases as indicated in parenthesis (" ") in this section are intended to have the meaning ascribed to them in this section applied to them throughout this document including the claims unless clearly indicated otherwise in context.

The term "or" as used in this specification and the appended claims is not meant to be exclusive rather the term is inclusive meaning "either or both".

References in the specification to "one embodiment", "an embodiment", "a preferred embodiment", "an alternative embodiment", "embodiments", "variations", "a variation" and similar phrases mean that a particular feature, structure, or characteristic described in connection with the embodiment(s) or variation(s) is included in at least an embodiment or variation of the invention. The appearances of the phrase "in one embodiment" or "in one variation" in various places in the specification are not necessarily all referring to the same embodiment or variation.

The term "couple", "coupled", "connected", "joined", "welded", "glued", "attached" or "fixed" as used in this specification and the appended claims refers to either an indirect or direct connection between the identified elements, components or objects. Often the manner of the coupling will be related specifically to the manner in which the two coupled elements interact.

The phrases "upright-style bicycle" and "upright-style bicycle frame" and similar phrases refer to bicycles and frames respectively wherein the rider typically sits upright on a small seat/saddle typically leaning forwardly bracing his/her arm/hands against a pair of handlebars. The "upright-style bicycle" is the most common and well known type of bicycle and accordingly the phrase as used herein does not deviate from that commonly held meaning. In contrast, a "recumbent bicycle" or "recumbent tricycle" is one in which the rider leans generally rearwardly in a supine position and the seat typically includes a back rest for support.

The term "road bike" refers to the style of bike that is most commonly used for riding on the road, street, or other paved, bitumen, or cement surfaces. This is opposed to the term "mountain bike" which refers to the style of bike that is most commonly used for riding where a "road bike" is not.

The term "group" refers to a group of components commonly sold as a set or kit and used to complete the assembly of a bike on a particular bicycle frame of the rider's choice. A group typically includes a rear derailleur, a front derailleur, a set of front and rear brakes, brake levers and shifters, hubs and sometimes, a seat post and/or pedals.

There are hundreds of tiny components associated with the cycling industry that are so common as to be redundant and therefore are excluded from the descriptions herein; Items such as wheel detail, tire detail, bearing detail, shifter detail, brake detail, sprocket detail, washers, nuts, bolts, bearings, O-rings, wheel hubs, spokes, cables and the like. Those individuals with ordinary skill in the art, with the benefit of this disclosure can, from the descriptions and diagrams provided herein easily and obviously understand and determine exactly what is required to manufacture, assemble, or buy items not shown.

An Embodiment of a Unique Recumbent Bicycle with Improved Rear Wheel Attachment Method:

An embodiment of a front wheel drive recumbent bicycle 1 is illustrated all or in part in FIGS. 1-22. Referring primarily to FIG. 1, in this embodiment, the bicycle is generally characterized by a relatively short wheelbase that is comparable to a traditional upright-style bicycle. The bicycle having a front end and a rear end. The front where the riders' feet 4 are depicted. The rear terminating behind and lower than the rider 60. The front end also called 'forward' or 'fore', the rear end also call 'rearward' or 'aft'.

Again referring all or in part in FIG. 1, starting at the rear of the bicycle and moving forward, the bicycle comprises a rear wheel support 48, also referred to herein as a rear fork;

a seat pan 47 and seat back 20 that are attached to the bicycle's main frame structure 45 with fixed or adjustable attachment at the seat pan mount 46 and seat back support 49; a front wheel support 44, and an adjustable pedal location assembly 7 to accommodate riders of different sizes. The components of the bicycle including the wheel set comprised of front wheel 40 and rear wheel 42, the drivetrain comprising front derailleur 5, rear derailleur 10, bottom bracket 6, pedals 8, cogs or freewheel 41 and chain 9. The bicycle further comprising the handlebars 3 and the front brakes 43 and rear brakes 999 including brake/shift levers 2. The drivetrain, handlebars and brake/shift levers are all typically interchangeable with those that are found in the bicycle industry such that specialized components are not required to outfit the recumbent bicycle of the present embodiment. The general position of a rider 60 when seated on the bicycle 1 is shown.

Figure 7:
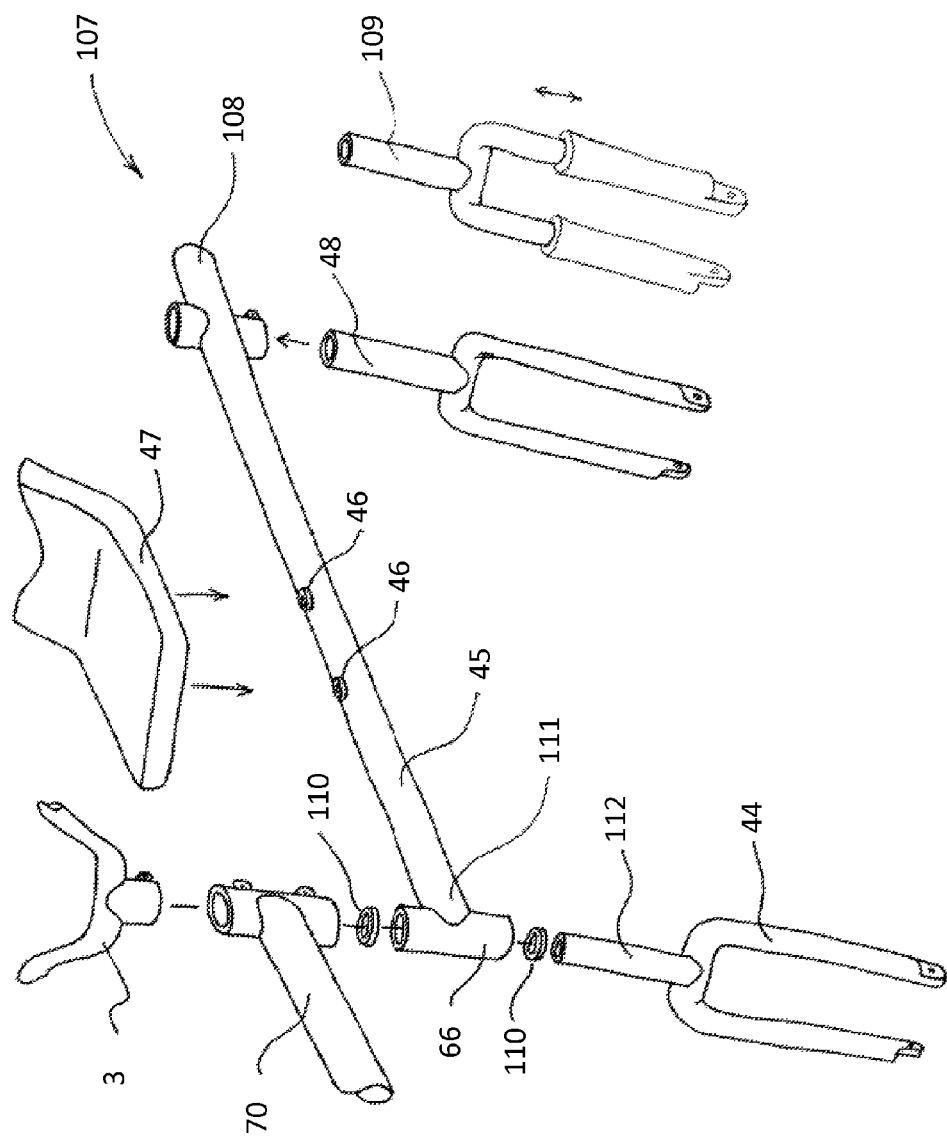
FIG. 7 is merely illustrative, and is comprised of an exploded view of the recumbent bicycle of FIG. 1 depicting two types of rear forks.
Figure 22:
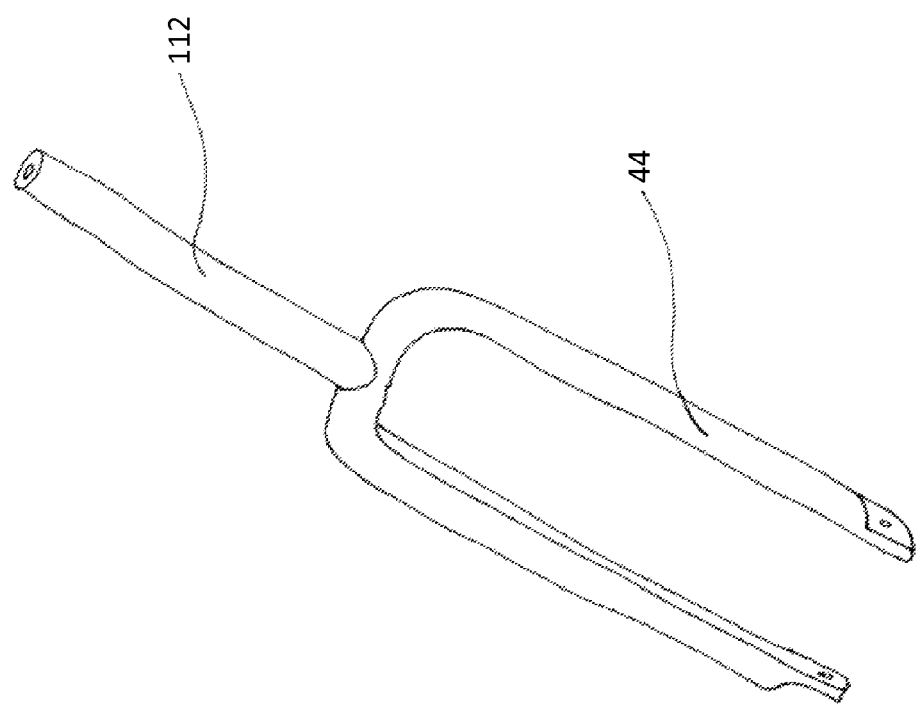
FIG. 22 is a perspective view of bicycle forks.

Referring to FIG. 7 and FIG. 22, a front wheel support 44 is shown, and is also known in the cycling industry as a "front fork" or "forks" or "fork". The forks have a steerer tube 112. The steerer tube 112 is commonly used by inserting it through a "head tube" 66 having bearings 110, and the handlebars 3 clamp to the steerer tube 112. By fastening the forks and handlebars together, when the handlebars are turned, they turn the front wheel in the direction desired.

Again referring to FIG. 1, both the front wheel support 44 and the rear wheel support 48 are common "front fork" styles used in the bicycle industry. In this embodiment, a "front fork", depicted as the rear wheel support 48, is uniquely utilized to attach the real wheel 42 to the rear end of the frame 45 using the rear head tube 61. The rear fork 48 is rigidly clamped to the frame 45 and is not permitted to turn. No bearings are utilized for the rear fork 48. Using a front fork to support a rear wheel embodies in FIG. 1 a unique recumbent bicycle with improved rear wheel attachment method.

Figure 2:
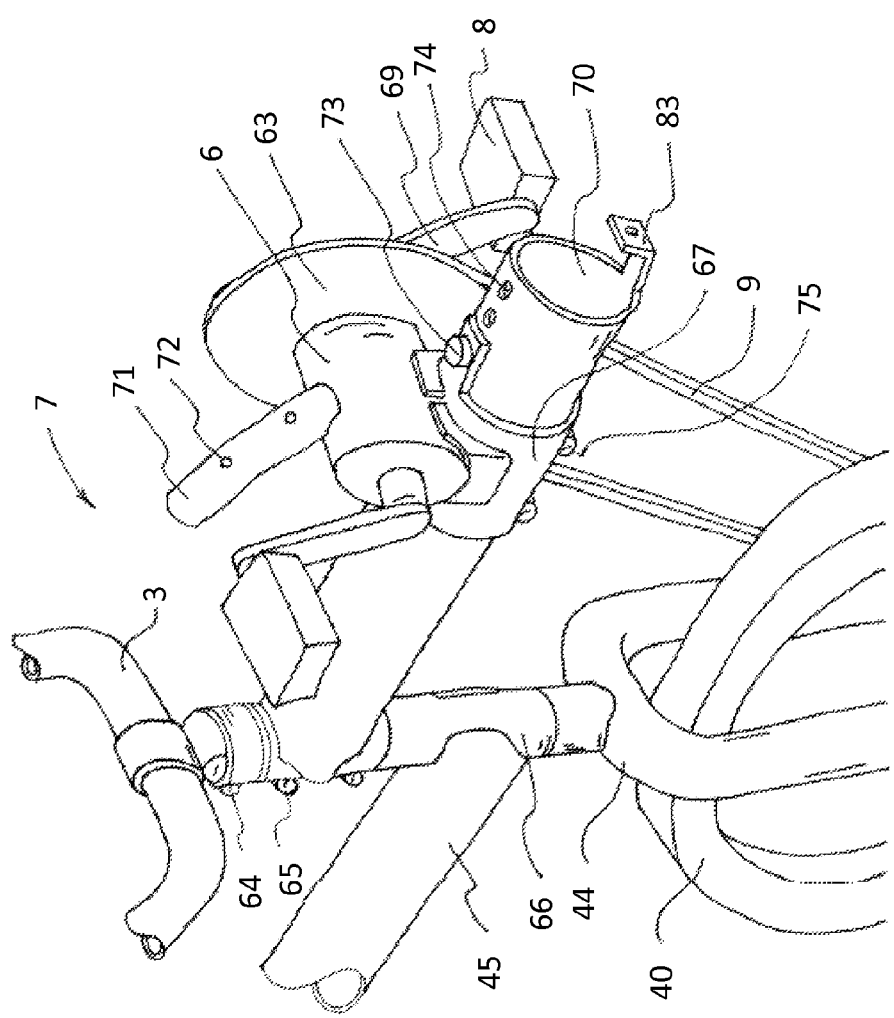
FIG. 2 is an enlarged perspective view of the bicycle of FIG. 1 with enhanced detail of the improved pedal locating and adjustment method, position adjustment, holes and screw.

An Embodiment of a Unique Pedal Locating and Adjustment Method for Front Wheel Drive Recumbent Bicycles:

Referring primarily to FIG. 2, an embodiment in perspective view of an adjustable pedal locating assembly 7 as previously described in FIG. 1 is shown. The frame 45 supports the front wheel support 44, also called a front fork, which supports the front wheel 40. The steerer tube 112 (see FIG. 22 for detail) of the front fork 44 slips through the front head tube 66, and protrudes through and beyond the front head tube 66. The adjustable pedal location assembly support member 70 slips over the steerer tube of the front fork 44 and is clamped to the steerer tube 112 with the adjustable pedal locating assembly support member fasteners 65. The handlebars 3 are similarly clamped to the steerer tube with handlebar fastener 64 as is common to the cycling industry. The front fork 44, handlebars 3, and adjustable pedal location assembly support member 70 are thus rigidly connected together and allowed to pivot in the head tube in unison in the same way a common bicycle handlebar turns the front wheel using bearings not shown. Refer to FIG. 7 for an exploded view with more detail. Slipping over the outside of the adjustable pedal locating assembly support member 70 is a bottom bracket support component 67, to which the bottom bracket 6 is rigidly and permanently attached. The bottom bracket 6 is typical of components used in the cycling industry and houses bearings for the pedals, as are the front sprocket 63, pedals 8 and pedal arms 69. The chain 9 is also shown. A front derailleur support beam 71 extends from the bottom bracket 6 and is positioned such that a front derailleur may be attached to it in the common fashion that is used in the cycling industry by those with skill in the art. The front derailleur support beam 71 may also support lights or water bottles using mounting holes 72. The Adjustable pedal location assembly support member 70 could be used to support lights, water bottles or other such attachments with mounting flange 83. The sprocket 63 shown in this embodiment is a 'single speed'. Mounting of a front derailleur is obvious to those with skills in the art using the front derailleur support beam 71. An alignment screw 73 and alignment holes 74 are provided to optionally locate the pedals further in the fore or aft position and provide correct orientation for pedaling. Bottom bracket support component fasteners 75 are used to adjustably clamp the bottom bracket support component 67 to the pedal location assembly support member 70. The uniquely combined sliding bottom bracket support component 67 and adjustable pedal location assembly support member 70 embody in FIG. 2 a unique pedal locating and adjustment method for front wheel drive recumbent human powered vehicles.

Figure 3:
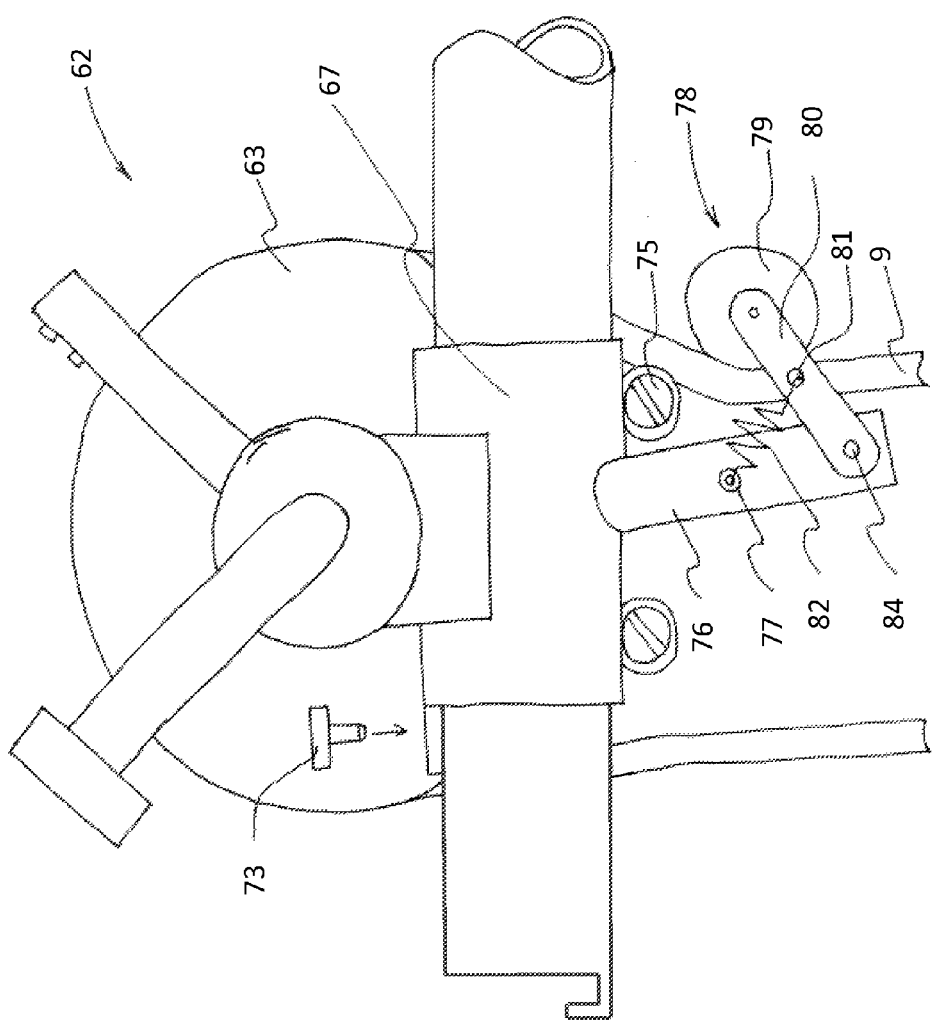
FIG. 3 is an enlarged side view of the pedal locating and adjustment method of FIG. 2 showing clamping bolts and position adjustment screw.

Pedal Assembly and Chain Tensioner Embodiment:

Referring primarily to FIG. 3, a depiction of a pedal assembly is shown in side view 62. The alignment screw 73 is shown in exploded view. On the bottom side of the pedal assembly is a tubular appendage 76 which is attached to the bottom bracket support component 67. The tubular appendage 76 supports a chain tensioner assembly 78. In this embodiment, the chain tensioner assembly 78 is comprised of an idler arm 80, an idler wheel 79, a spring 82, a spring pivot on the support bracket 77, a spring attachment on the idler arm 81 and a pivot point 84. In this embodiment the chain tensioner is depicted as providing tension to the chain 9 on the side of the front sprocket 63 which experiences highest tension during the pedaling process. The embodiment depicted is only meant to convey the utility of a chain tensioner, the technology for which is common in the industry. As force increases or decreases in the chain 9, the idler arm 80 is allowed to pivot about pivot point 84 with spring 82 keeping tension on the chain 9. When a shock absorbing front shock is installed, the distance between the front wheel center and the front sprocket 63 centers will fluctuate either during a bump, or rebound. The purpose of the chain tensioner is to keep the chain 9 tight on the front sprocket 63 as the distance between the centers just described fluctuates. The embodiment depicted is only meant to convey the utility of a chain tensioner, the technology for which is common in the industry. A chain tensioner could also be mounted on the wheel near the rear derailleur.

Figure 4:
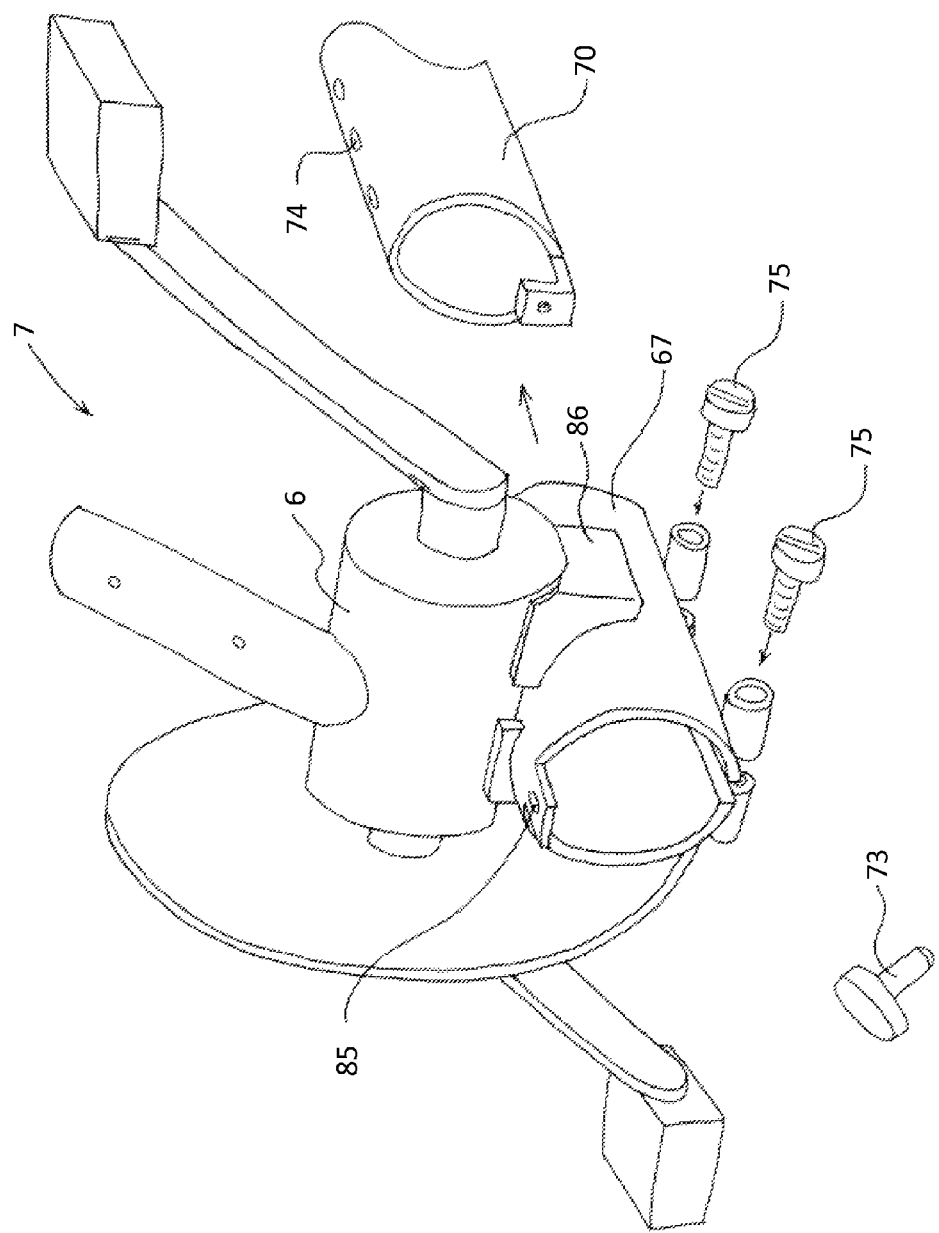
FIG. 4 is an enlarged perspective exploded view of the pedal locating and adjustment method of FIG. 2 detached from support beam. Clamping bolts in exploded view, position adjustment bracket, and support beam leading to primary frame structure also in exploded view.

Pedal Assembly Adjustment Embodiment:

Referring primarily to FIG. 4, a depiction of the pedal assembly 7 is shown. The pedal assembly 7 is comprised of the bottom bracket support component 67 of this embodiment, the bottom bracket 6, and all previously described attachments including the bottom bracket support component fasteners 75. The bottom bracket support component 67 and the bottom bracket 6 are permanently joined and in this embodiment are supported by gussets 86. The pedal assembly 7 of this embodiment is longitudinally adjustable on the adjustable pedal location assembly support member 70. Pedal assembly 7 adjustment is accomplished by loosening the bottom bracket support component fasteners 75 and alignment screw 73, and sliding the entire assembly fore or aft relative to pedal location assembly support member 70. The Adjustable pedal location assembly support member 70 has alignment holes 74 at regular intervals axially located on the adjustable pedal location assembly support member 70, which the pedal assembly alignment hole 85 aligns with, and the alignment screw 73 is inserted through both to provide vertical alignment. After the desired position is attained and the alignment screw 73 is inserted, the crank set support component fasteners 75 are re-tightened and this provides a clamping force upon the adjustable pedal location assembly support member 70 to rigidly locate the pedal assembly 7 upon the adjustable pedal location assembly support member 70. This is merely an embodiment of one fastening method. Other methods are common to those with skill in the art.

Figure 23:
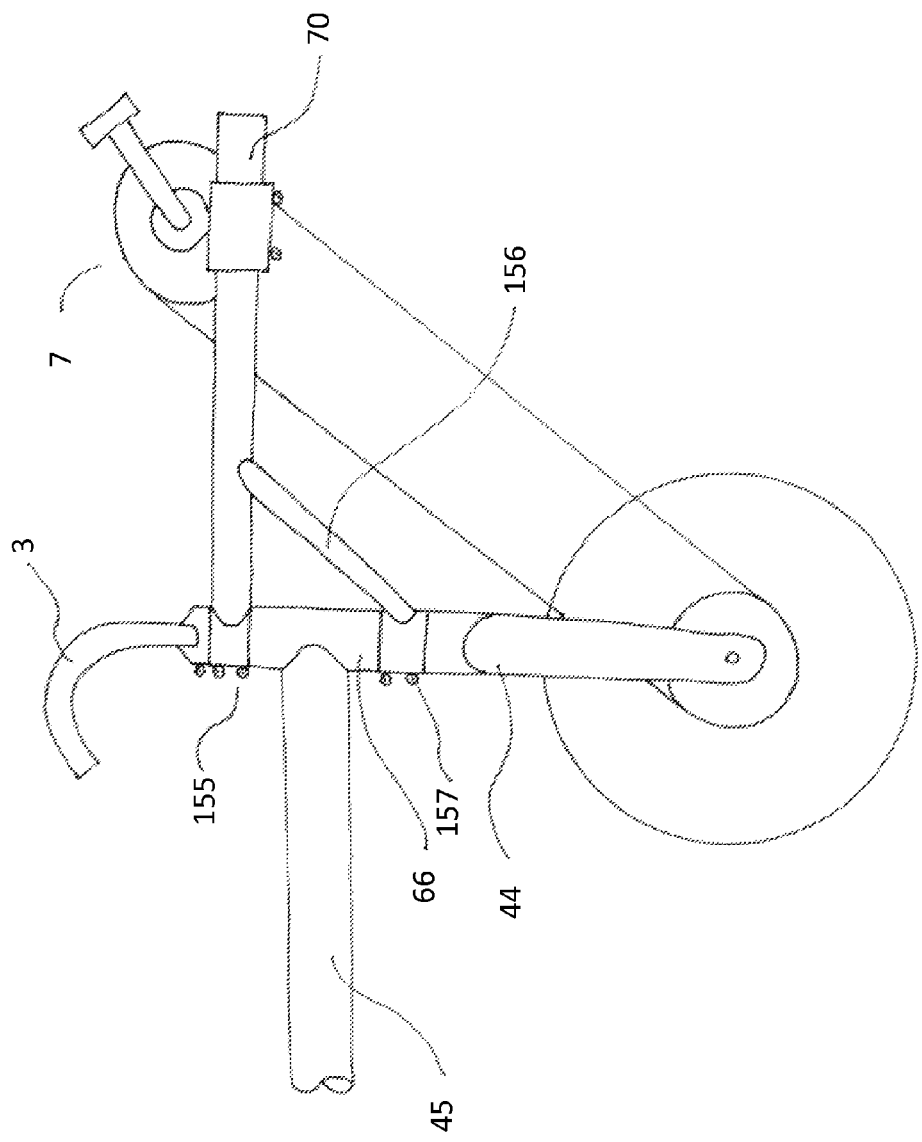
FIG. 23 is a profile view of an alternative embodiment utilizing a support beam with a truss.

Alternative Pedal Beam Embodiment:

Referring primarily to FIG. 23 an alternative embodiment of the adjustable pedal location assembly support member 70 is shown having a support truss 156. The adjustable pedal location assembly support member 70 and support truss 156 are integral and joined together as one unit. Assembly of this unit would require that it be placed adjacent to the head tube 66 and the front fork 44 steerer tube is then inserted. Fasteners 155 and 157 fasten the adjustable pedal location assembly support member 70 and support truss 156 to the steerer tube, and then the handlebar is attached as normal.

Figure 13:
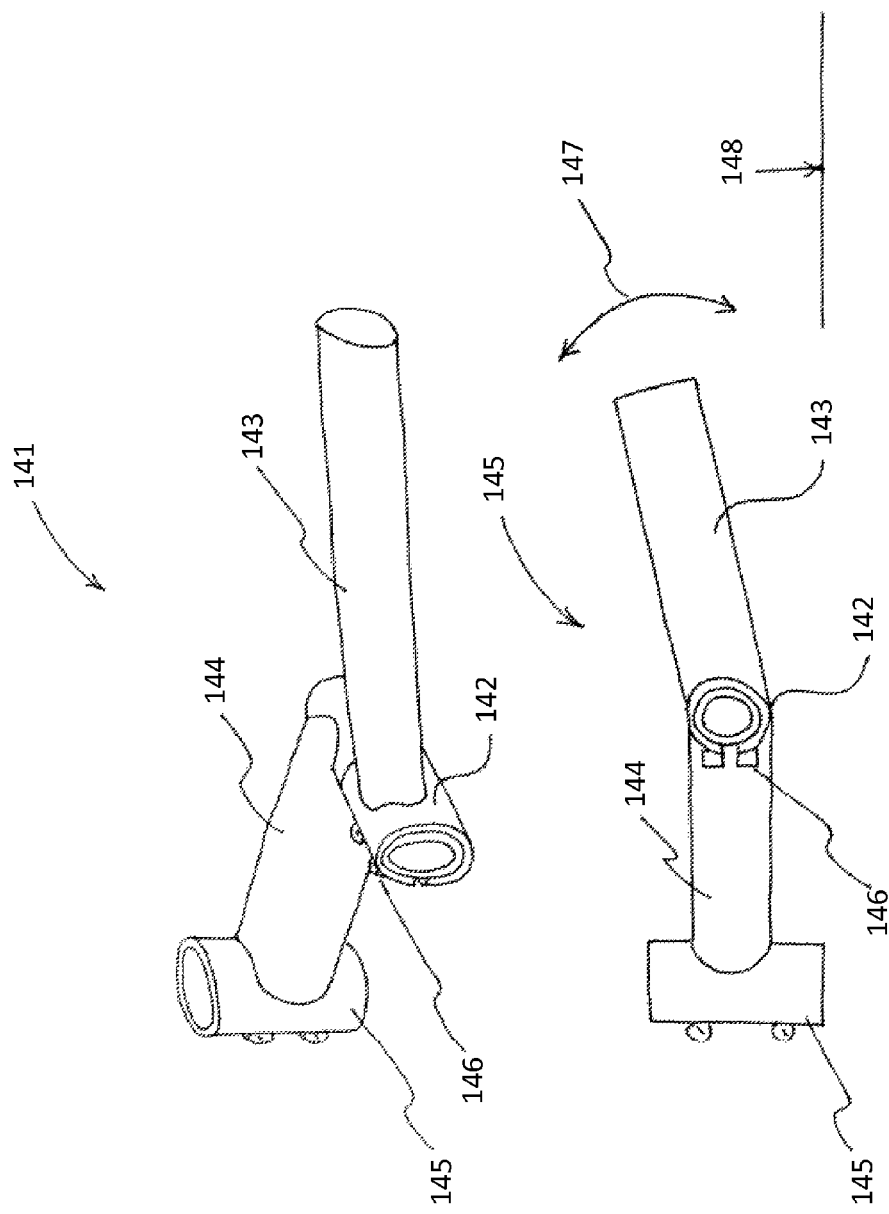
FIG. 13 is a view of an alternative embodiment of the adjustable pedal location assembly support member with a centrally located pivot that allows vertical height adjustment of the adjustable pedal location assembly.

Pivotable Pedal Support Beam Embodiment:

Referring primarily to FIG. 13, an alternative configuration of the adjustable pedal locating assembly support member is shown in side view 145 and perspective view 141. In this embodiment, the adjustable pedal locating assembly support member 143 is permitted to pivot about a base 142 in a turret like fashion. The base 142 is allowed to pivot around a base mount member 144 which can be adjustably fastened to the front fork steerer tube with a clamping piece and fasteners 145. The assembly 141 is attached to a front wheel drive recumbent vehicle. Alternatively, for a rear wheel drive recumbent, base mount 144 would be permanently attached to the frame and not able to pivot with the wheel. Yet in both variations the adjustable pedal locating assembly support member 143 is permitted to pivot about a base 142 in a turret like fashion. When the desired location has been achieved, the fasteners 146 are tightened, preventing relative motion.

The purpose and effect of the pivotable support member is to raise or lower the position of the pedals relative to the rider seat pan height 148 as shown with arrow 147. Pedal height adjustment of this kind is advantageous for individual riders to be able to local the height of the pedals in the location preferred for their unique physiology providing optimal comfort.

Figure 12:
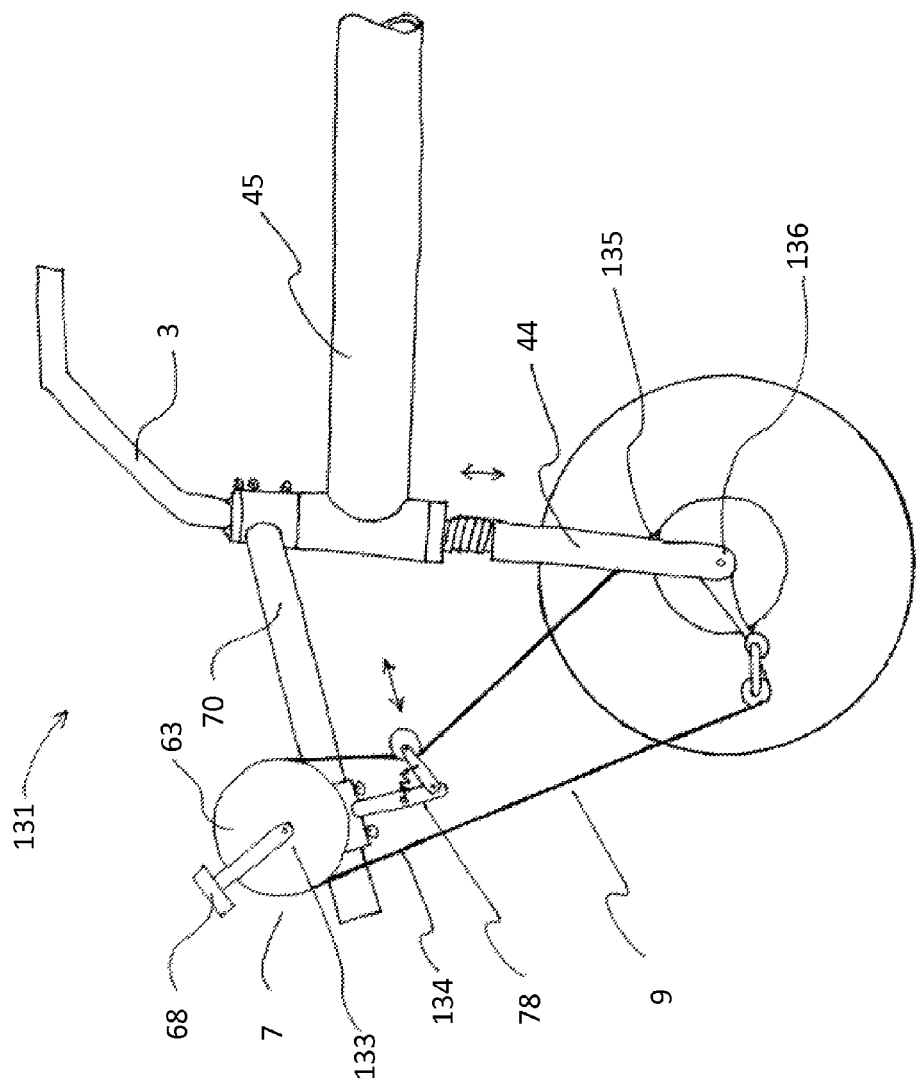
FIG. 12 is a profile view of the recumbent bicycle of FIG. 1 embodied with a chain tensioner mounted to the improved pedal adjustment method assembly of FIG. 2.

Chain Tensioner:

Referring primarily to FIG. 12, a depiction of another embodiment of a chain tensioner is shown in view 131. In view 131 is shown the frame 45, front forks 44 embodied as shock absorbing design, handlebars 3, embodiment of an adjustable pedal locating assembly support member 70, adjustable pedal locating assembly 7 and a chain tensioner 78. When a shock absorbing front shock 44 is installed, the distance between the front wheel center 136 and the sprocket center 133 will fluctuate either during a bump, or rebound of the shock. The purpose of the chain tensioner 78 is to keep the chain 9 tight on the sprocket 63 as the distance between the centers just described fluctuates. The embodiment depicted is only meant to convey the utility of a chain tensioner, the technology for which is common in the industry. A chain tensioner could also be mounted on the wheel near the rear derailleur on the opposite side of the wheel sprocket at location indicated by 135. It may also be desirable to have a chain tensioner on the high tension side of the sprocket 63 as shown or the low tension side of the sprocket at the location indicated by leader arrow 134 or some permutation thereof.

Figure 5:
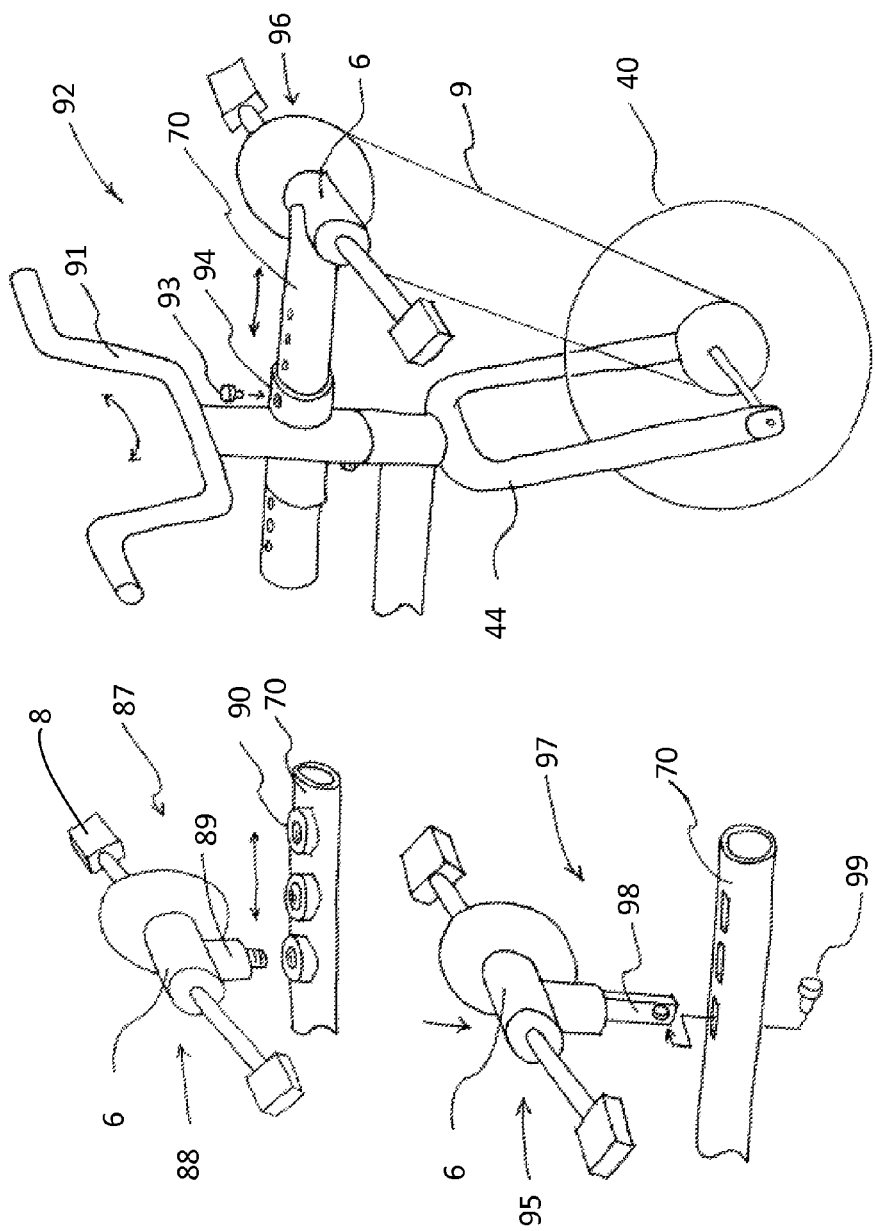
FIG. 5 is comprised of three views of various pedal position adjustment methods, including a depiction wherein the pedals are attached to the support beam and the support beam translates through a handlebar mounted tube.

An Embodiment of a Uniquely Combined Handlebar and Pedal Locating Method for a Front Wheel Drive Recumbent Bicycles:

Referring primarily to FIG. 5, several perspective views are shown. In view 87, pedal assembly 88 is embodied with an alternative location method. View 87 shows pedal assembly 88, consisting of a bottom bracket 6, pedals 8, and other common components known to those with skill in the art. The bottom bracket 6 is permanently attached to a support piece 89 and is retained and located using threaded embossments 90 permanently affixed to the adjustable pedal locating assembly support member 70 and regularly spaced. This embodiment would achieve similar results as the other embodiments described herein. In view 97, pedal assembly 95 is embodied with an alternative locating method. View 97 shows pedal assembly 95 as being retained and located using an oblong rod 98 and pin 99 with the rod being rigidly affixed to the pedal assembly 95, inserted through holes in the adjustable pedal locating assembly support member 70 and regularly spaced. This embodiment would achieve similar results as the other embodiments described herein. In view 92, pedal assembly 96 is embodied with an alternative locating method. View 92 shows pedal assembly 96 as being retained on the end of the adjustable pedal location assembly support member 70 and sliding through a handlebar mounted adjustment and support tube 94. The adjustable pedal locating assembly support member 70 is retained with any number of fasteners 93. The handlebar mounted adjustment and support tube 94 is rigidly attached to the handlebars 91 forming an integral member. The handlebar unit 91 is then clamped to the front fork 44 steerer tube as shown in other embodiments depicted herein. 40 is the front wheel. A chain 9 is also shown. This embodiment would achieve similar results as the other embodiments described herein but is different in that the adjustable pedal locating assembly support member 70 slides through the handlebar piece. The uniquely combined adjustable pedal locating assembly support member 70 and integral handlebar support tube 94 embody in FIG. 5 a uniquely combined handlebar and pedal locating method for a front wheel drive recumbent bicycles.

Figure 20:
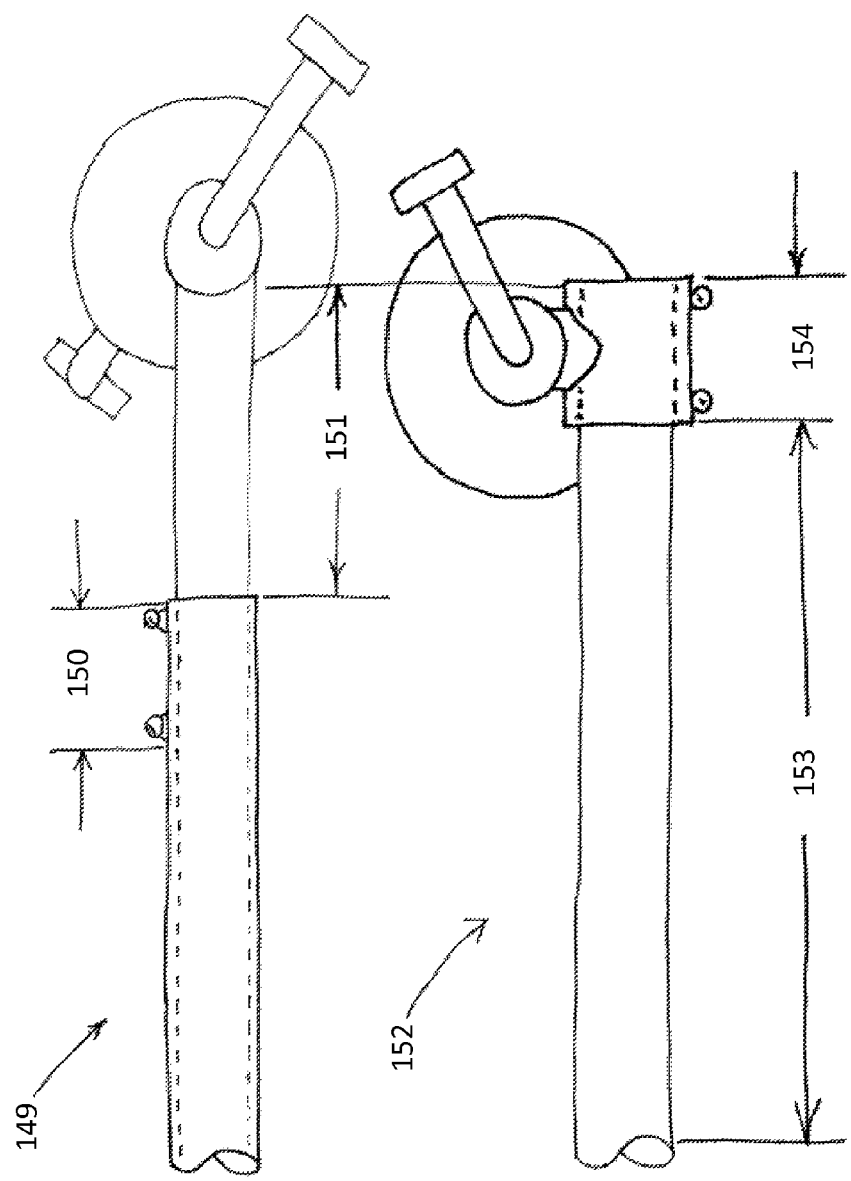
FIG. 20 illustrates how the revealed pedal location method, for the same amount of support material, advantageously increases the pedal adjustment distance.

Range of Pedal Adjustment Over Prior Art Details:

Referring primarily to FIG. 20, a depiction of the prior art is compared to that of the pedal adjustment revealed herein. Shown in view 149 is the prior art with a clamping area 150 and adjustment length 151. Shown in view 152 is the revealed art with a clamping area 154 and adjustment length 153. It is shown that for a comparable clamping length where 150 and 154 are equal to one another, an improved adjustment length is realized in the revealed art. It is evident that prior art adjustment length 151 is of a reduced length than that of the revealed art adjustment length 153 even though approximately the same amount of material is used for the support beam. This diagram illustrates one of the advantages of the revealed art over prior art. By using less material, weight is saved on the vehicle—which is greatly advantageous on human powered vehicles.

Figure 6:
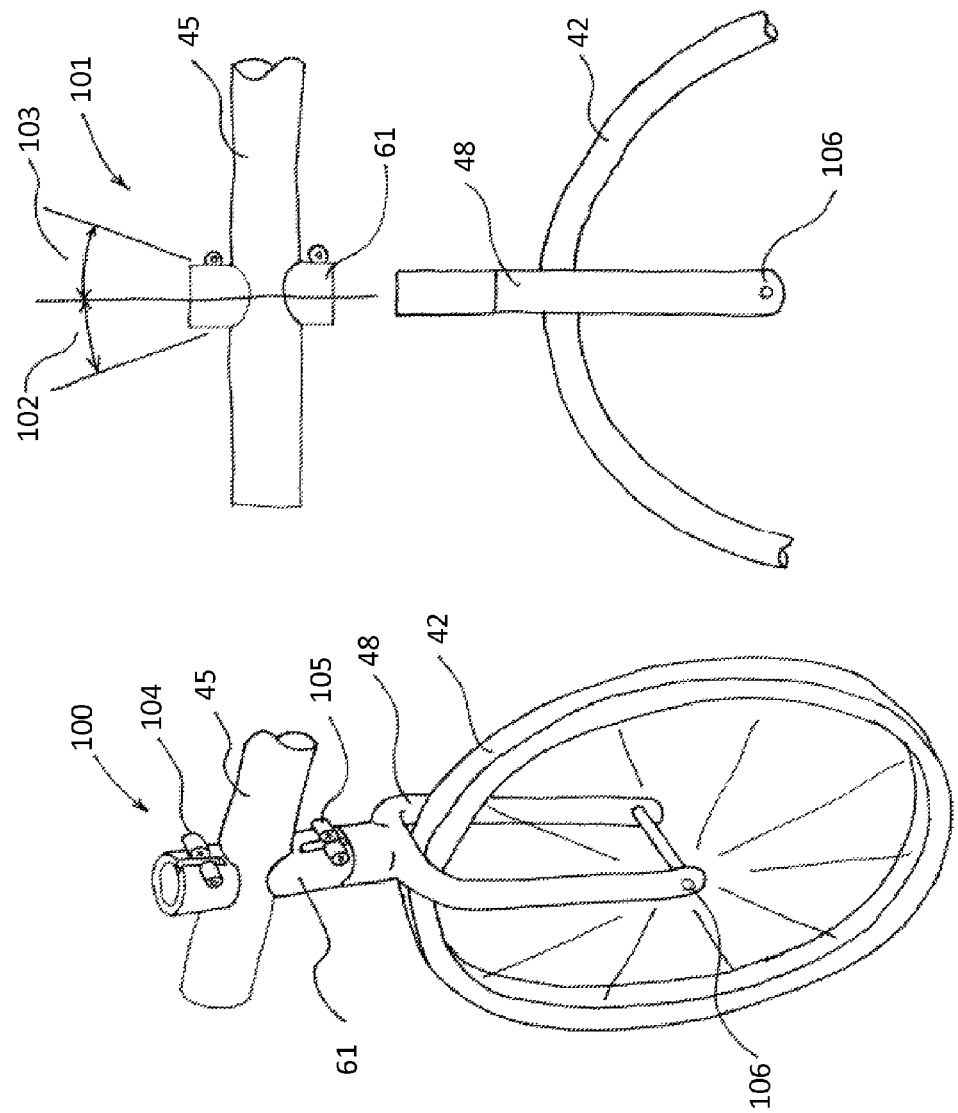
FIG. 6 is comprised of two views of the real wheel attachment method herein revealed. One in perspective view, the other in profile and depicting angles of adjustment, fore and aft, 103 and 102 respectively.

Rear Wheel Support Angle Adjustment Details:

Referring primarily to FIG. 6, a depiction of the rear wheel attachment method as previously described in FIG. 1 is shown in view 100 in perspective. The rear wheel 42, is attached to a rear wheel support 48 (also known as a fork). The rear wheel support 48 is a "front fork" commonly used in the bicycle industry for attaching a bicycle's front wheel, but in the revealed art it is used to attach the rear wheel instead. The rear wheel 42 is retained with a hub bolt 106 common to the industry. The rear wheel support 48 is inserted into and retained to the frame 45 with a rear head tube 61 that is permanently attached to the frame 45. No bearings are used and the inner diameter of the rear head tube 61 is such that when clamped to the fork, clamping force rigidly retains the fork in the desired location. This clamping method is obvious to those with skill in the art and could be achieved in many other ways. In this embodiment, the rear head tube 61 is permanently affixed to frame 45 by using methods known to those with skill in the art (such as welding). In this embodiment, clamping force is accomplished with a top fastener 104 and bottom fastener 105 which provide clamping force upon the steerer tube of the rear wheel support 48 (also known as a fork). Utilizing a "front fork" to attach a rear wheel is unique and advantageous to the cycling industry for several reasons. One, the rear wheel support 48 can be exchanged by the owner to any brand or style they choose providing a high level of choice for the owner. A few examples are Aluminum forks, Steel forks, Carbon Fiber forks, or shock absorbing forks. Each fork style has performance characteristics that cyclists find beneficial under varying riding conditions (such as racing or touring, on or off road). Two, the rear wheel support 48 can be a "shock absorbing" fork. This is highly advantageous in that it significantly reduces the complexity over prior art in accomplishing a "full suspension" recumbent bicycle when used in conjunction with a shock absorbing fork on the front wheel. It also significantly reduces complexity over prior art when using a rear shock absorbing fork instead of complicated pivoting mechanism of prior art. Third, the frame geometry and ride height of the rider can be adjusted by adjusting the clamping location of the rear head tube 61 on the rear wheel support 48. Adjusting the ride height up or down by adjusting the clamping position upon the steerer tube of the rear fork. This simple adjustment method is comparable to how seat posts are adjusted in prior art. The rear wheel support 48 is a 'front fork' commonly used in the industry to support the front wheel of a bicycle, but in the revealed art, a front fork is used instead to support the rear wheel. The utility of this embodiment is very advantageous because a rider may, when riding their bike on hard paved surfaces that are smooth, want to use rigid forks in both the front and rear positions because there are pedaling energy efficiencies gained. It is common knowledge to those in the cycling sport that shock absorbing suspensions consume energy when pedaling. This is minimized with rigid frame and wheel support construction. Alternatively, the rider may want to ride their bike on bumpy dirt roads, in which case, with the revealed art, the rider may, at their discretion, swap the rigid forks in both the front and the rear and use instead shock absorbing forks in both the front and rear, and thus transform their "rigid frame" human powered vehicle into a "fully-suspended" human powered vehicle at their leisure. Using the shock absorbing forks will drastically increasing the riders comfort when riding on bumpy roads or tracks and provides highly advantageous options for the rider when configuring their bicycle. Alternatively, the rider may choose to have a shock absorbing fork in the front and rigid in the rear or some combination thereof based upon their own belief of the "best" combination. Cyclists will find this ability highly advantageous. Touring cyclists who ride for extended durations upon their bikes, perhaps for months, over unanticipated and unpredictable terrain will find this ability especially desirable. Carrying a spare fork for alternating conditions and being able to swap it out with the other would be highly advantageous and desirable.

Referring primarily to FIG. 6, a depiction of the rear wheel attachment method as previously described in FIG. 1 is shown in view 101 in profile. In this embodiment the rear wheel support 48 is perpendicular to the frame 45. Depending upon the desired performance characteristics, the angle of the rear wheel support 48 may be adjusted by varying the attachment angle of the rear head tube 61 creating an angle that is not perpendicular to the main frame 45, but is instead leaning in the direction of angle 102 or angle 103. In this embodiment, the rear head tube 61 angles 102 and 103 are not intended to be manually adjusted, and the attachment is depicted as permanent as would be built by the frame manufacturer. One can easily envision that in other embodiments, the head tube 61 could be made to be adjustable rather than fixed to the frame 45. This would be trivial to those with skill in the art and may be beneficial for certain types of cycling or frame loading situations or sports such as 'touring' or 'racing' either 'on' or 'off' road.

Exploded View of Rear Wheel Support Frame:

Referring primarily to FIG. 7, an exploded view 107 of the frame 45 is shown. Frame 45 has a front end 111 and a rear end 108. A partial view of the seat pan 47 is shown with attachment embossments 46.

The Adjustable pedal locating assembly support member 70 is shown. The handlebars 3 are shown. The front fork 44 is shown. The front fork steerer tube 112 is shown. Also shown is a rear fork 48 which does not have shock absorbers, and for reference a rear fork which has shock absorbers 109. The rear forks can be used interchangeably, as can the front forks, which must be wider at the axle mounts to allow for the wider wheel hub having sprockets attached (not depicted).

Figure 8:
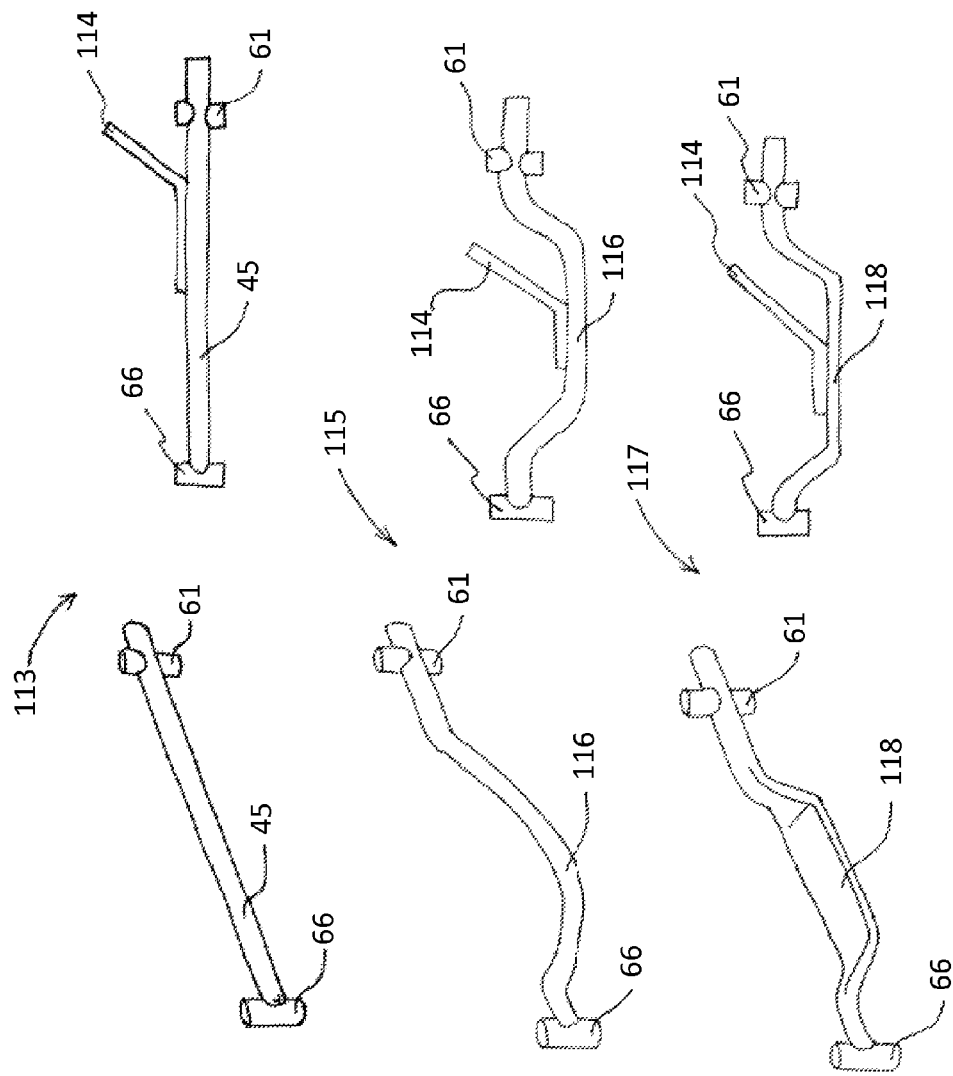
FIG. 8 is comprised of several perspective and profile views of the primary frame member of recumbent bicycle revealed in FIG. 1 and is illustrative of various frame embodiments.

Various Frame Embodiments:

Referring primarily to FIG. 8, several views of various frame embodiments are shown. The purpose of the views of FIG. 8 are to convey the idea that the frame has been embodied as generally straight and tubular, but in fact could be many shapes or profiles. In view 113 is shown the embodiment of the frame 45 as primarily discussed in the bulk of this document. Frame 45 is essentially a straight tube having a front and rear with a front head tube 66 and a rear head tube 61. A seat 114 is shown. In view 115 is shown the embodiment of a frame 116. Frame 116 is a bent tube having a front and rear with a front head tube 66 and a rear head tube 61. A seat 114 is shown. In view 117 is shown the embodiment of a frame 118. Frame 116 has a tubular front end, and a tubular rear end, connected by a generally flat section of material. Frame 116 still has a front head tube 66 and a rear head tube 61 in the same locations. A seat 114 is shown.

Figure 9:
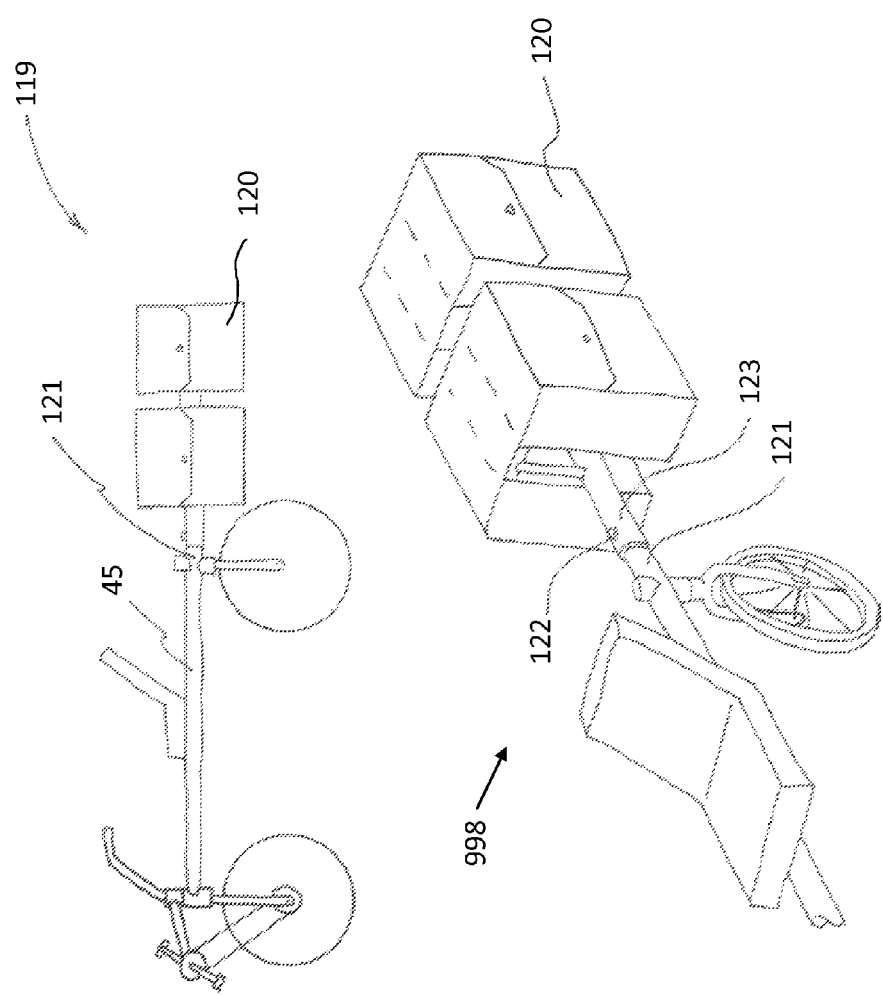
FIG. 9 is comprised of two views, profile and perspective, of the recumbent bicycle in FIG. 1 depicting Panniers removeably attached to the primary frame member.

Pannier Embodiments:

Referring primarily to FIG. 9, in view 119 and perspective view 998 a recumbent bicycle of FIG. 1 is shown with panniers 120 attached. The panniers 120 are attached to frame 45 at the rear end of the bike, which in this embodiment has a rearward protrusion 121, with an attachment screw 122. Attachment screw 122 can be removed, thereby releasing the pannier support member 123 and the panniers 120.

Figure 10:
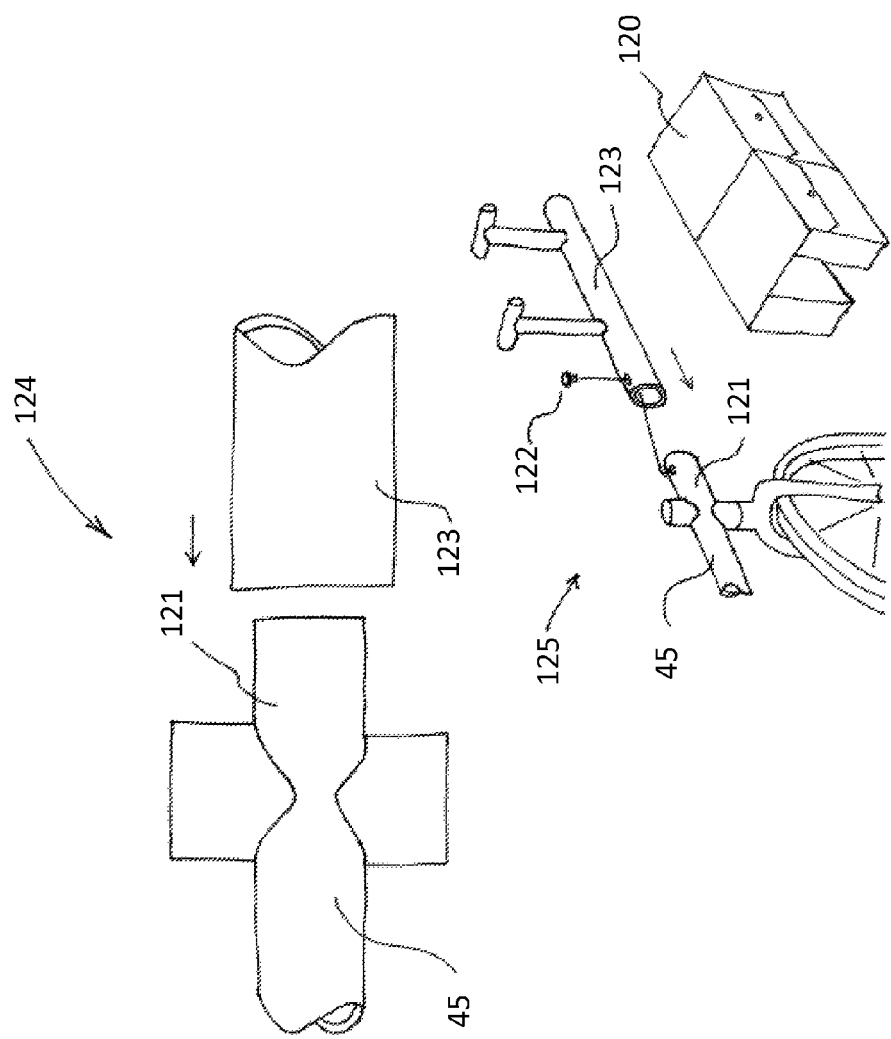
FIG. 10 is comprised of two views of the detachable Pannier mounting method.

Referring primarily to FIG. 10, in view 124 is shown the rear end of frame 45, rearward protrusion 121, and the pannier attachment 123. The pannier attachment 123 is embodied as a tube which slides over the rearward protrusion 121. In view 125 is shown a perspective of the rear end of frame 45 with the pannier attachment 123 detached. The pannier attachment screw 122 is shown detached also. The pannier attachment 123 is embodied as a tube which slides over the rearward protrusion 121 and retained with attachment screw 122. The panniers 120, attach to the pannier attachment 123.

Figure 11:
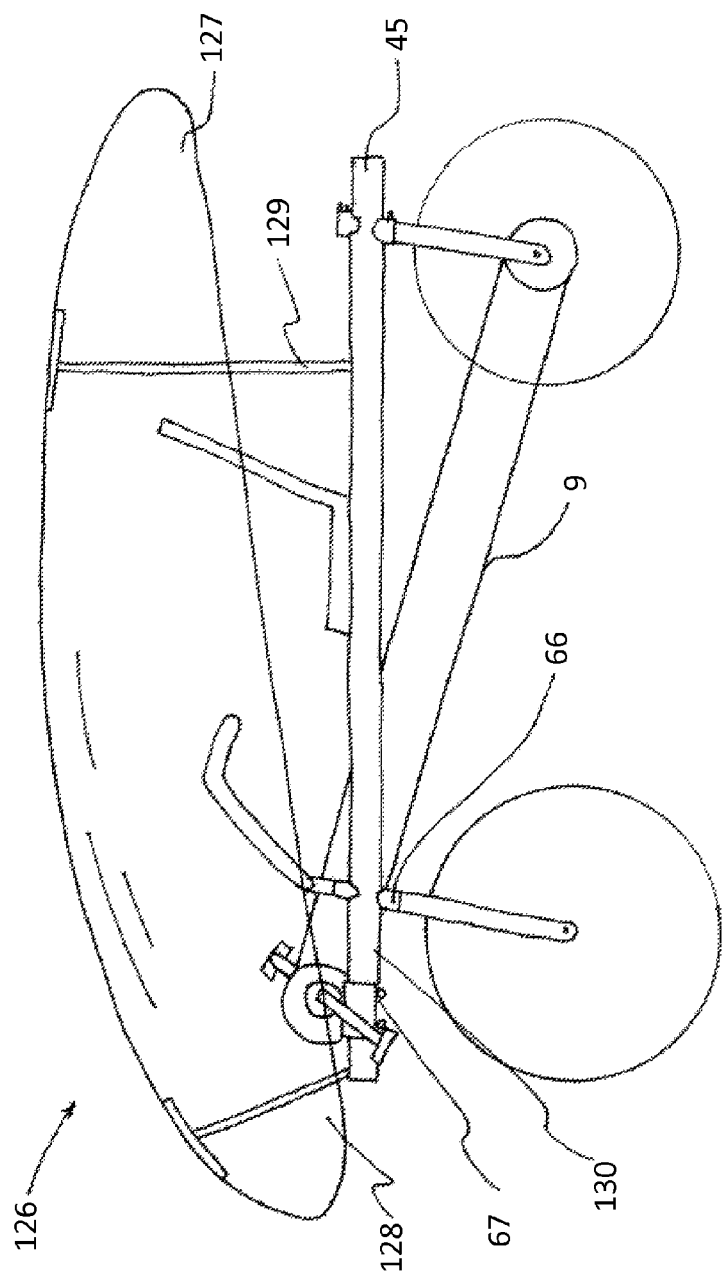
FIG. 11 depicts a rear-wheel powered recumbent bicycle utilizing the improved pedal adjustment method of FIG. 2 with fairing attached.

An Embodiment of a Unique Recumbent Bicycle Having an Improved Pedal Locating and Adjustment Method for Rear Wheel Drive Recumbent Bicycles; and, an Embodiment of a Unique Combination of Said Improved Pedal and Adjustment Method as Well as Improved Rear Wheel Attachment Method:

Referring primarily to FIG. 11, in view 126 is shown the bicycle generally embodied in FIG. 1 except in this embodiment, the bicycle is embodied as a rear wheel powered bicycle having a fairing 127 with a front attachment 128 and a rear attachment 129. Fairings are typically translucent or clear and provide for improved aerodynamic characteristics compared with the unfaired variation and may also provide protection from the wind and rain. In this embodiment, the concept is almost identical to the front wheel driven bicycle of FIG. 1. However, the frame 45 extends beyond the front head tube 66 and forms a protruding extension 130 to which the sliding bottom bracket support component 67 is attached in the same manner described in FIG. 2. The extension is part of the frame and does not pivot. This is necessary for the rear wheel drive configuration. The front wheel and handle bars turn in common fashion to that of existing art. The uniquely combined sliding bottom bracket support component 67 and protruding extension 130 embody in FIG. 11 a unique recumbent bicycle having an improved pedal locating and adjustment method for rear wheel drive recumbent bicycles. FIG. 11 also embodies a unique combination of said improved pedal and adjustment method as well as improved rear wheel attachment method.

Figure 14:
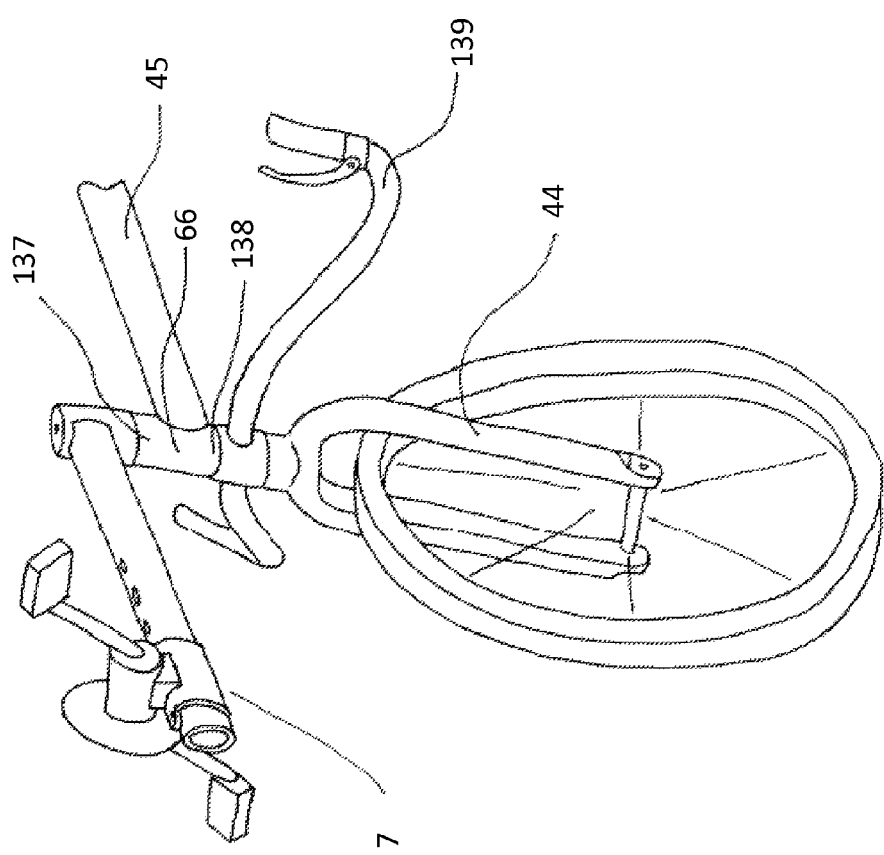
FIG. 14 is a perspective view of the recumbent bicycle in FIG. 1 having an alternative 'under frame' handlebar embodiment.

Underframe Steering Embodiment:

Referring primarily to FIG. 14, a perspective view of the recumbent bicycle in FIG. 1 with an alternative 'under frame' handlebar embodiment shown. In similar fashion to that previously described the front forks 44 support underframe handlebars 139 and the adjustable pedal locating assembly 7. The front forks 44 are supported by and attached to the frame 45 in similar fashion as is common in the bicycle industry. In this embodiment, the underframe handlebars 139 are located adjacent to the front header tube 66, but on the bottom side of the front header tube 138 instead of the top side of the front header tube 137. It is an intuitively obvious progression of thought that the adjustable pedal locating assembly 7 and the underframe handlebars 139 could be swapped in their positions and attached to the front forks 44. In an alternative embodiment not shown, the front forks 44 could have the handlebars advantageously welded or permanently attached to them, further simplifying the assembly and reducing weight.

Figure 15:
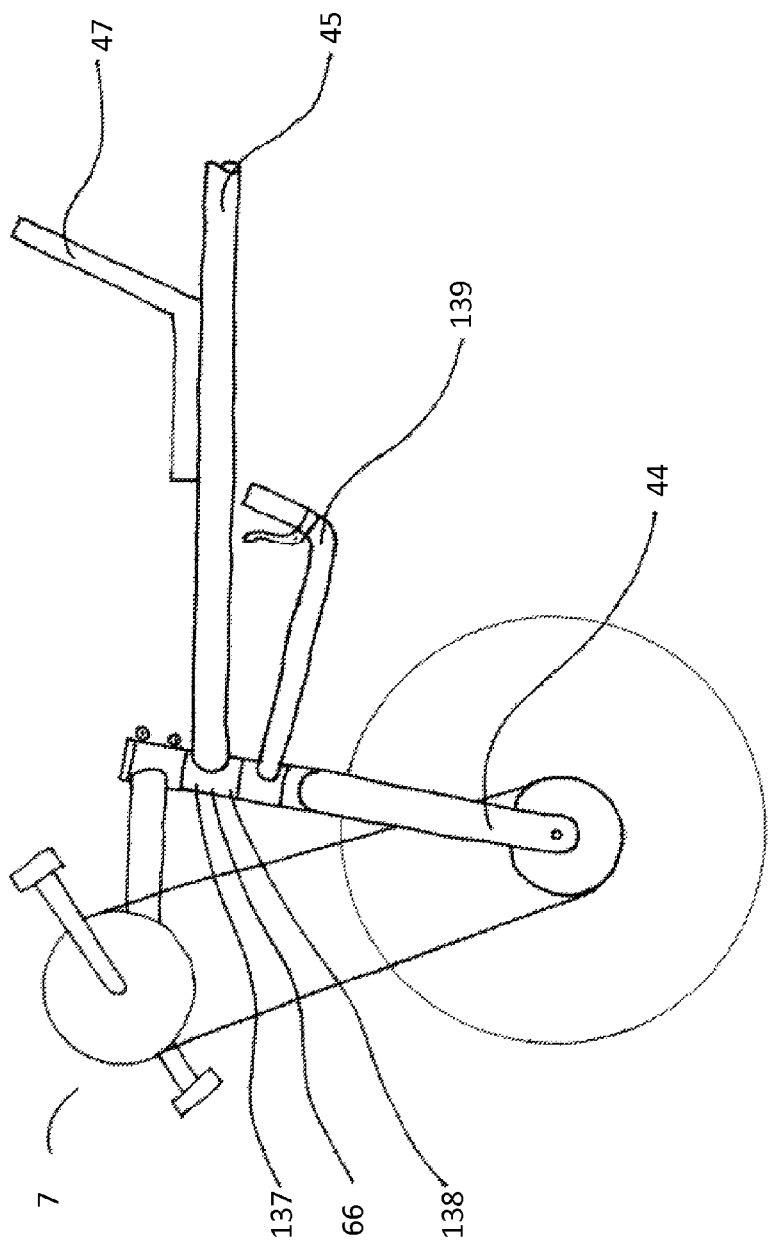
FIG. 15 is a profile view of the recumbent bicycle in FIG. 1 having an alternative 'under frame' handlebar embodiment.

Referring primarily to FIG. 15, a perspective view of the recumbent bicycle in FIG. 1 with an alternative 'under frame' handlebar embodiment is shown. In similar fashion to that previously described the front forks 44 support underframe handlebars 139 and the adjustable pedal locating assembly 7. The front forks 44 are supported by and attached to the frame 45 using the front header tube 66 in similar fashion as is common in the bicycle industry and described previously herein. The seat 47 is also shown. In this embodiment, the underframe handlebars 139 are located adjacent to the front header tube 66, but on the bottom side of the front header tube 138 instead of the top side of the front header tube 137. It is an intuitively obvious progression of thought that the adjustable pedal locating assembly 7 and the underframe handlebars 139 could be swapped in their positions and attached to the front forks 44. In an alternative embodiment not shown, the front forks 44 could have the handlebars advantageously welded or permanently attached to the front forks 44 to further simplify the assembly and reduce weight.

Figure 16:
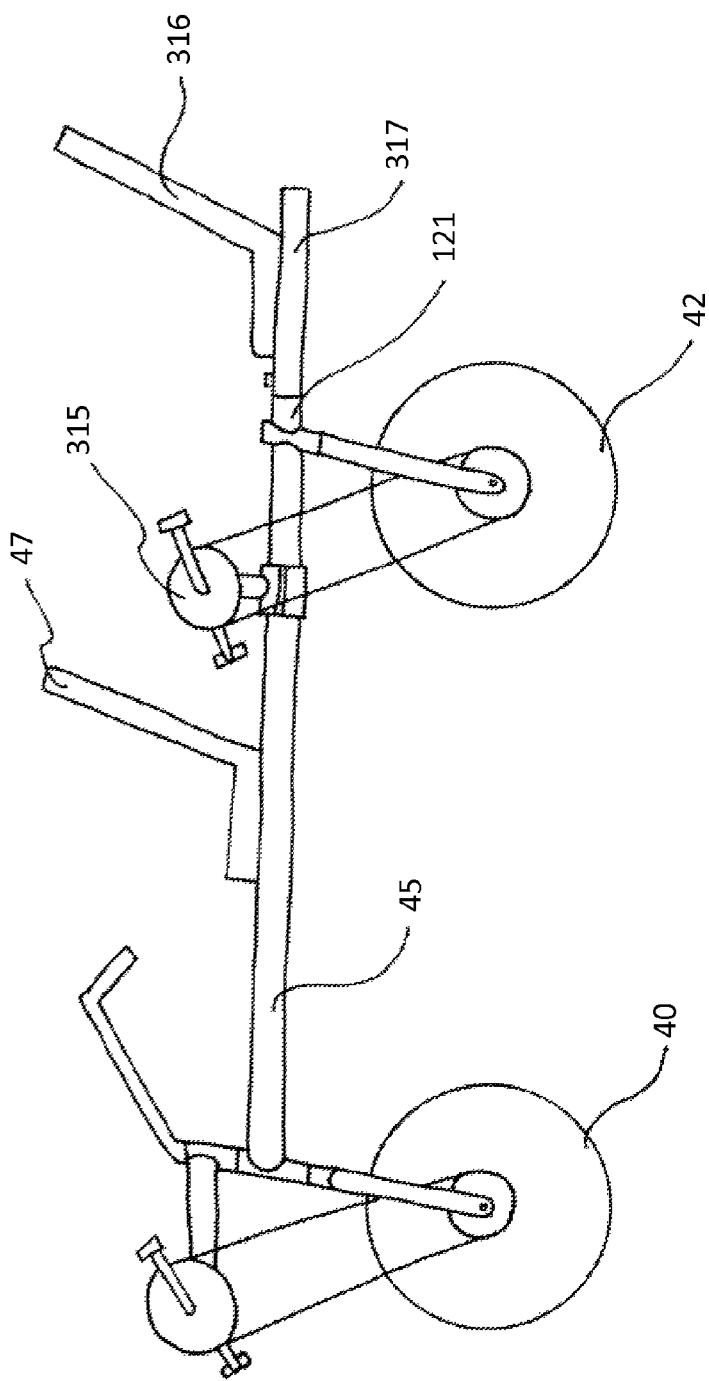
FIG. 16 is a profile view of the recumbent bicycle in FIG. 1 having an alternative 'tandem rider' embodiment for two riders at the same time with both riders facing forward.

Tandem Embodiments:

Referring primarily to FIG. 16, a profile view of an alternative embodiment of the recumbent bicycle in FIG. 1 having an alternative 'tandem rider' embodiment for 2 riders at the same time with both riders facing forward. A front wheel 40 and a rear wheel 42 are shown. Attached to and extending from the frame 45 rearward protrusion 121 in similar fashion to that shown for the pannier attachment described in FIG. 10, is a tandem seat attachment 317. The tandem seat attachment 317 is comprised of a tubular member to which is attached a rear seat 316 that is facing forward in the same direction of the front seat 47. In front of the rear seat 316 is embodied a tandem adjustable pedal locating assembly 315. The tandem adjustable pedal locating assembly 140 position is adjustable along the axis of the frame 45. The rear seat 316 could also be permanently attached to frame 45 by extending frame 45 beyond that which is depicted to support the rear seat 316. Advantageously, the front fork assembly including wheel, sprocket and all other drivetrain components—except perhaps the chain—could be duplicated entirely and used in the rear as well.

Figure 17:
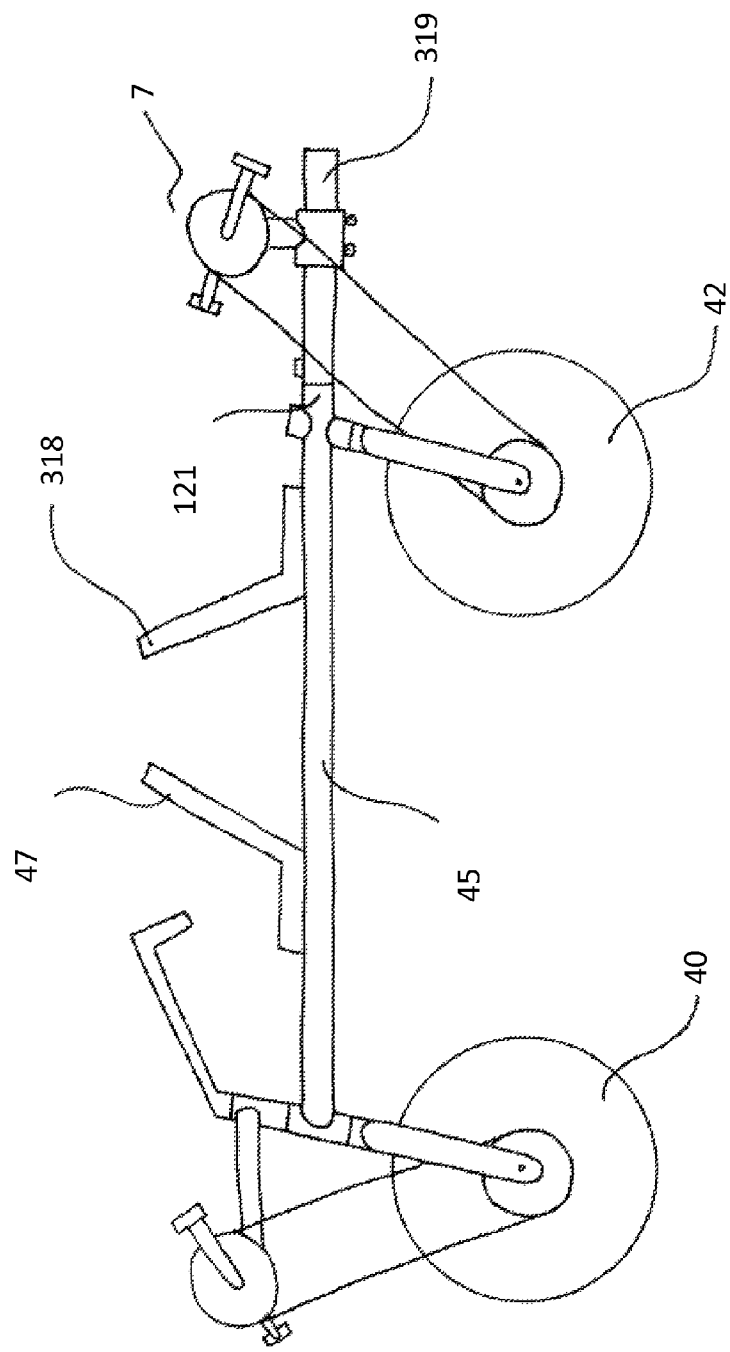
FIG. 17 is a profile view of the recumbent bicycle in FIG. 1 having an alternative 'tandem rider' embodiment for two riders at the same time with one rider facing forward and the other rider facing aft, or in the reverse direction.

Referring primarily to FIG. 17, a profile view of an alternative embodiment of the recumbent bicycle in FIG. 1 having an alternative 'tandem rider' embodiment for two riders at the same time with one rider facing forward and one rider facing aft in the opposite direction. A front wheel 40 and a rear wheel 42 are shown. Attached to and extending from the frame 45, a rearward protrusion 121 is shown in similar fashion to that shown for the pannier attachment described in FIG. 10. An adjustable pedal locating assembly 7 which has been slid over and clamped to attachment member 319. The pedal assembly 7 attachment member 319 is comprised of a tubular member supporting the pedal assembly 7. Attachment member 319 is rigidly attached to frame 45. The pedal assembly 7 position is adjustable along the axis of the attachment member 319. A front seat 47 is facing forward, and a rear seat 318 is facing in the opposite direction. Two riders can ride this tandem recumbent bicycle and would face in the opposite direction to one another. The pedal assembly 7 attachment member 319 shown could also be permanently attached to frame 45 by extending the rearward protrusion 121 beyond that which is depicted and eliminating detachable member 319. Advantageously, the front fork assembly including wheel, sprocket and all other drivetrain components—except perhaps the chain—could be duplicated entirely and used in the rear.

Figure 18:
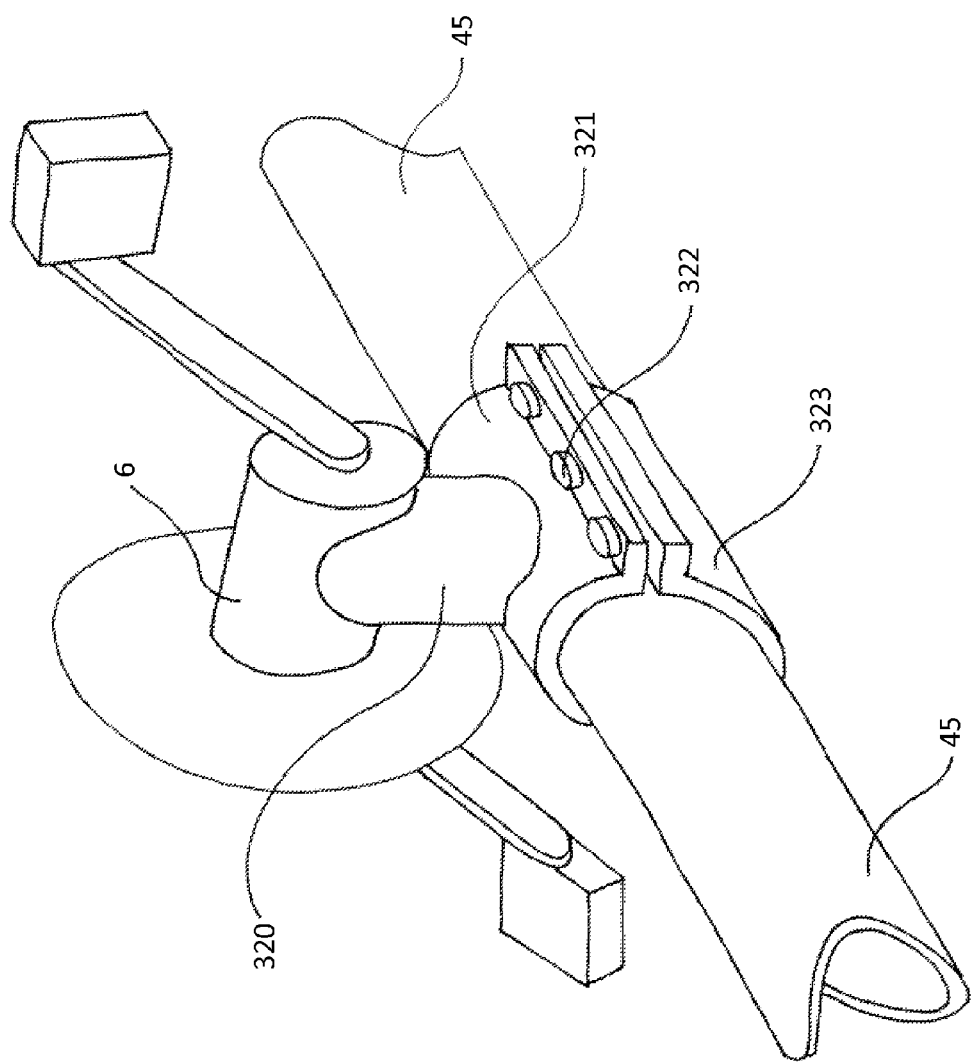
FIG. 18 is a perspective view of an adjustable pedal assembly used for the tandem rider embodiments shown in FIG. 16 that is removable by removing the fasteners.

Referring primarily to FIG. 18, a perspective view is shown of an adjustable pedal assembly used for the tandem rider embodiments shown in FIG. 16 and FIG. 17. The frame 45 supports the pedal assembly bottom half 323 and pedal assembly top half 321. The top half 321 and bottom half 323 are clamped together around the frame 45 and held in place frictionally by clamping force provided by bolts 322. To the top half 321 is rigidly attached the bottom bracket 6 support member 320. The remainder of the assembly is similar to that depicted in FIG. 2. By loosening bolts 322, the pedal assembly may slide forward or aft on the frame 45 to adjust the location of the assembly relative to the rider.

Figure 19:
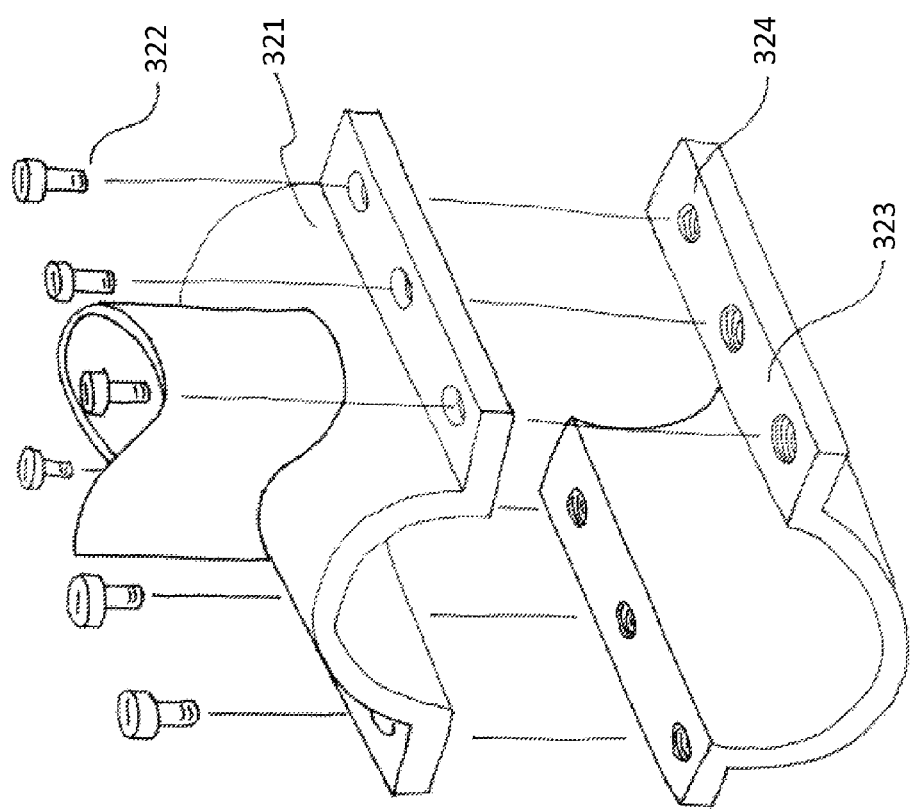
FIG. 19 is an exploded perspective view of the adjustable pedal assembly shown in FIG. 18.

Referring primarily to FIG. 19, an exploded perspective view of the adjustable pedal assembly of FIG. 18 is shown. The embodiment shown depicts in exploded view the pedal assembly bottom half 323, pedal assembly top half 321, and bolts 322. In this embodiment, the bolt holes 324 are threaded.

This simplicity and multi-use of components across three frame embodiments (the single rider, tandem riders both forward facing, and tandem riders one facing forward the other aft), is cause for efficiency in maintainability and cost reduction during manufacture. For example, during manufacture, additional frame members and assembly jigs are not required for all three modes of construction.

Figure 21:
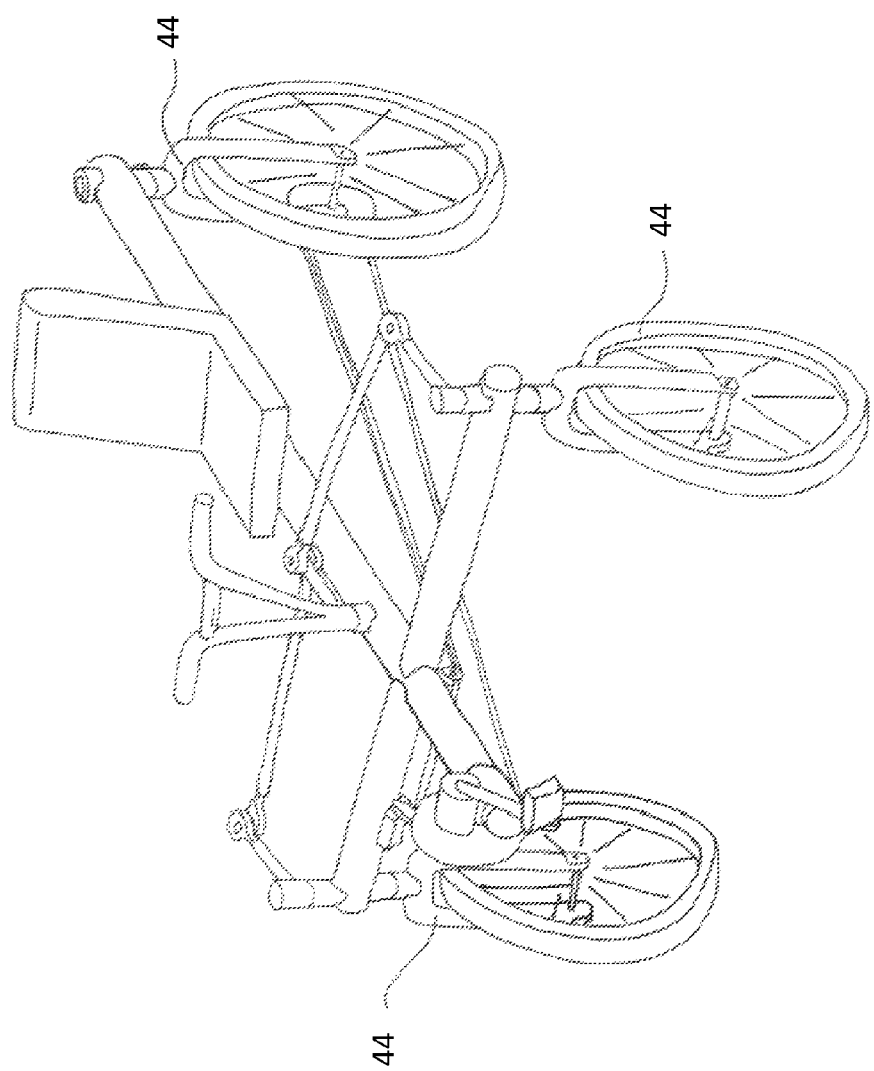
FIG. 21 is a perspective view of a tricycle embodiment utilizing on all three wheels bicycle forks only used on front wheels in existing art. Each rigid fork may be interchanged for shock-absorbing designs providing advantage to the owner with increased options.

Tricycle Embodiment:

Referring primarily to FIG. 21, a tricycle embodiment is shown wherein each of the three wheels is supported using the front fork 44 of a bicycle. In this embodiment, each fork—normally only used on the front wheel of a bicycle, could be interchanged with a shock absorbing design. The ability to swap forks and interchange them at the will of the owner is highly advantageous. Also shown in this embodiment is the pedal adjustment method shown in FIG. 11. FIG. 21 embodies a unique recumbent tricycle having an improved pedal locating and adjustment method. FIG. 21 also embodies a unique recumbent tricycle with improved rear wheel attachment method.

The invention claimed is:

1. A recumbent bicycle with improved rear wheel attachment comprising:
   a. a frame consisting of a primary frame member having a front end and a rear end located at opposite ends,
   b. a front head tube located and permanently attached to the front end of the frame,
   c. a rear head tube located and permanently attached to the rear end of the frame,
   d. a front fork, a drivetrain, handlebars, wheel and miscellaneous components located and attached at the front end of the frame,
   e. a rear fork detachably attached to the rear head tube such that it is rigidly attached and not permitted to pivot,
   f. a seat attached to the frame, and
   g. a rear wheel attached to the rear fork, wherein the rear fork supports the rear end of the frame and the rear fork may be removed and exchanged for another style of fork.

2. A recumbent bicycle according to claim 1 wherein the rear head tube is not perpendicular with the primary frame member's primary axis.

3. A recumbent bicycle according to claim 1 further includes a removably attached pannier rack.

4. A recumbent bicycle according to claim 1 wherein the frame further comprises a permanently attached second seat assembly to the rear of the bicycle.

5. A recumbent bicycle according to claim 4 Further includes a second adjustably located pedal assembly, said pedal assembly is removably attached to the frame.

6. A recumbent bicycle according to claim 1 wherein the frame further comprises a second seat assembly attachable to the rear of the bicycle.

7. A recumbent bicycle according to claim 6 further comprises a second detachably attached pedal assembly and an attachment member; the member is connected to the rear end of the primary frame; the pedal assembly is secured to the member and may be moved along its length.

8. A recumbent bicycle according to claim 4, 5, or 6 further comprises an attachment member removably attached to the rear end of the primary frame.

* * * * *